United States Patent [19]

Panesar et al.

[11] Patent Number: 5,361,346

[45] Date of Patent: Nov. 1, 1994

[54] PORTABLE TESTER (QUALIFIER) FOR EVALUATING AND TESTING SCSI INTERFACE MAGNETIC DISC DRIVES IN ACCORDANCE WITH ANSI SCSI-A AND SCSI-2 DEFINITIONS

[75] Inventors: Param Panesar; James K. Berger, both of Santa Monica, Calif.

[73] Assignee: Santa Monica Pioneer Research Inc., Santa Monica, Calif.

[21] Appl. No.: 820,912

[22] Filed: Jan. 15, 1992

[51] Int. Cl.$^5$ .............................................. G06F 11/00
[52] U.S. Cl. ................................... 395/575; 371/29.1
[58] Field of Search ............................... 371/21.1, 29.1; 395/575

[56] References Cited

U.S. PATENT DOCUMENTS

| | | | |
|---|---|---|---|
| 4,843,544 | 6/1989 | DuLac et al. .................. | 364/200 |
| 4,998,069 | 3/1991 | Nguyen et al. .................. | 324/539 |
| 5,239,632 | 8/1993 | Larner .......................... | 395/525 |
| 5,257,393 | 10/1993 | Miller ........................... | 395/800 |

*Primary Examiner*—Charles E. Atkinson

[57] ABSTRACT

A programmable menu driven qualifier designed to make the abstract nature of small computer system interface (SCSI) definition easier to understand and work with. The qualifier is intended for testing and evaluating direct access and sequential access SCSI devices, such as disc drives and tape drives connected to the qualifier by an SCSI bus, the testing being carried out in accordance with ANSI SCSI-1 and ANSI SCSI-2 definitions. The qualifier is completely menu driven, and all commands are executed with a single keystroke of the keyboard. The qualifier uses a simple built-in concept which allows an operator quickly to become familiar with an SCSI protocol and command structure.

9 Claims, 40 Drawing Sheets

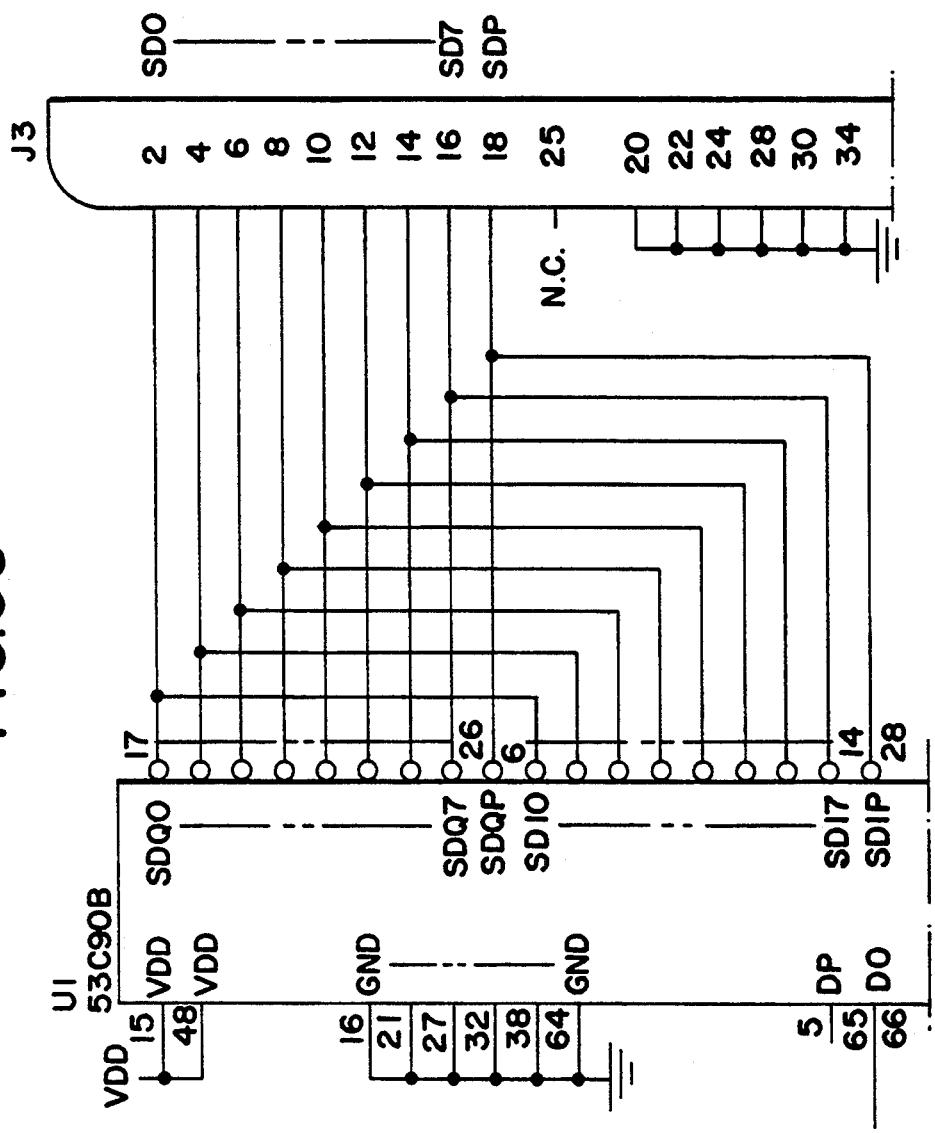

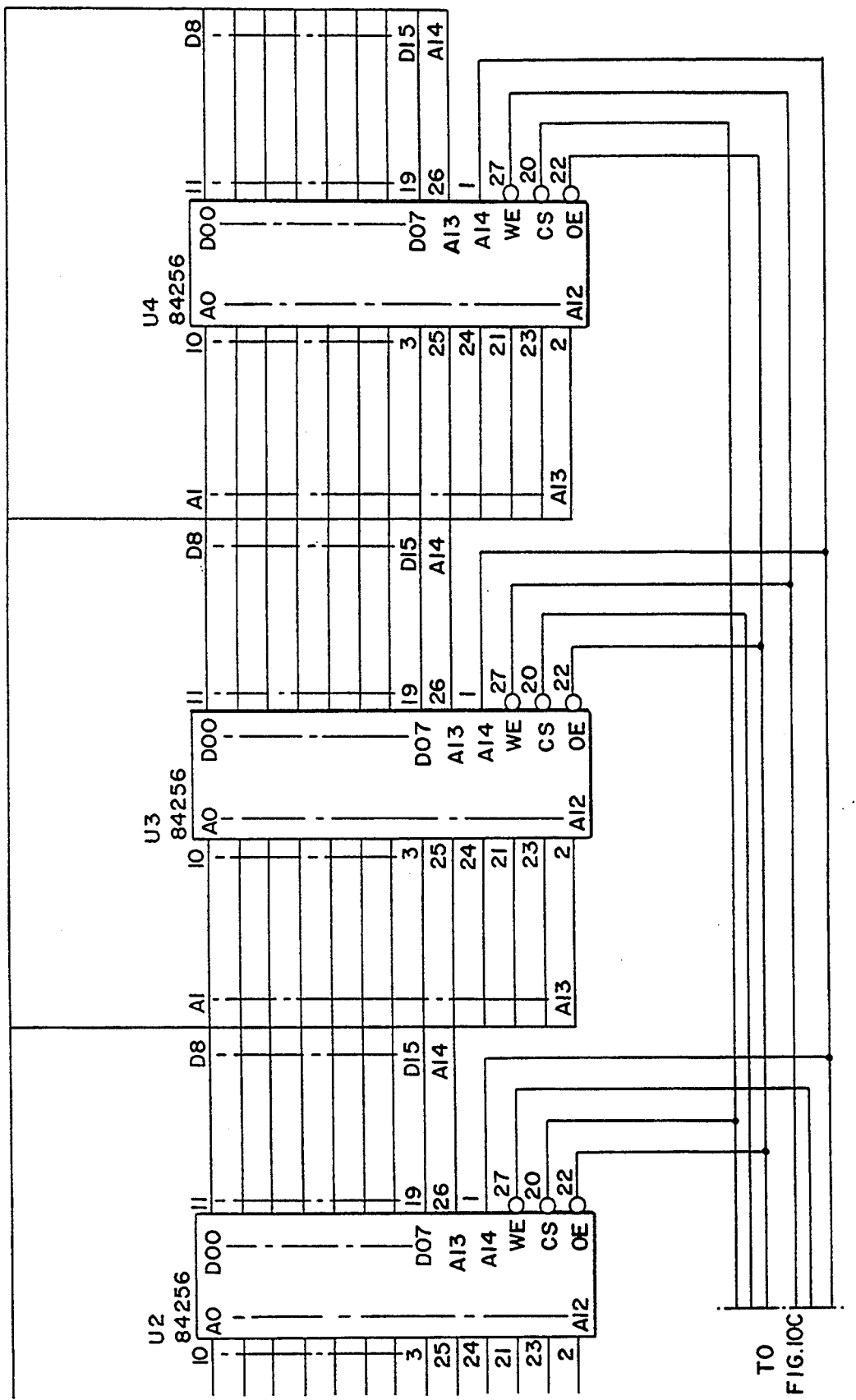

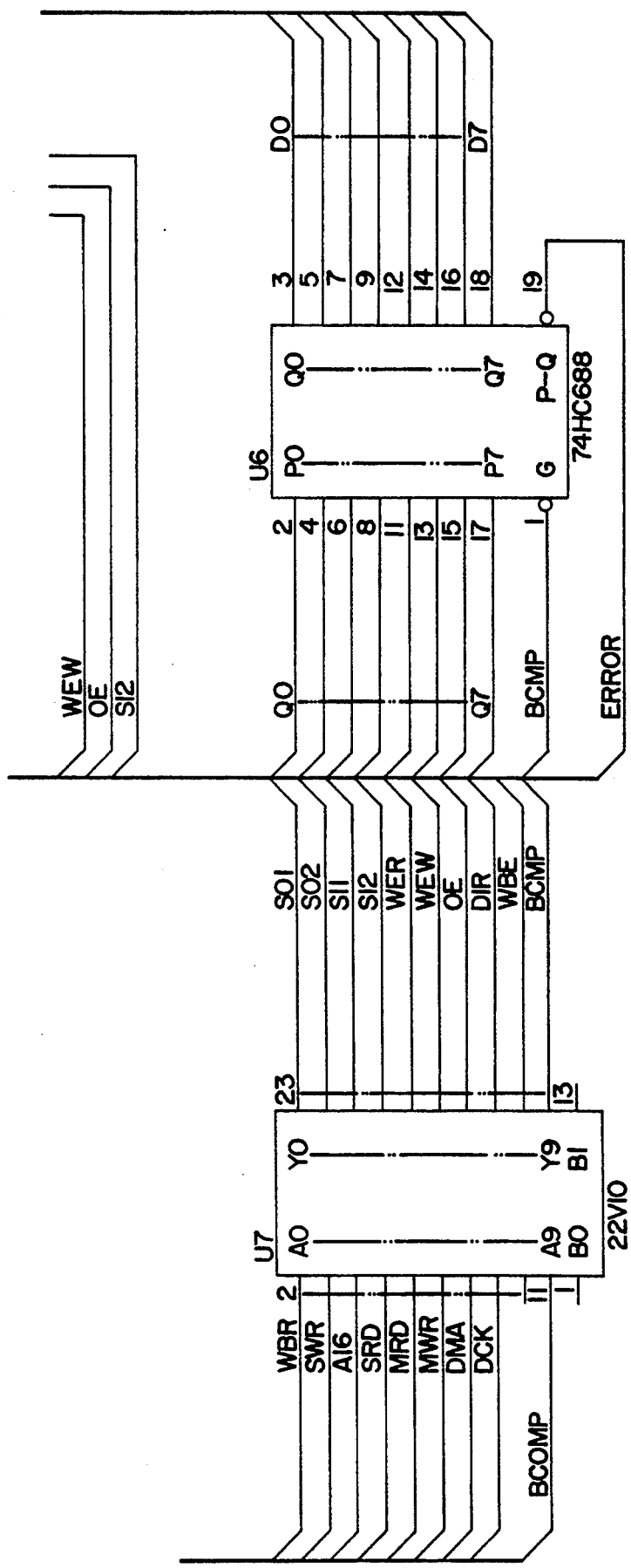
FIG. IIC

FIG.12

MAIN MENU           SELECT MENU ITEM       03:46:23 PM

0   SELECT TARGET ID      B   RESORT SCSI BUS ACTIVITY
1   6 CDB SCSI COMMANDS
2   10 CDB SCSI COMMANDS
3   VENDOR UNIQUE COMMANDS
4   CANNED DIAGNOSTICS
5   USER CREATED PROGRAMS
6   TESTER FUNCTIONS
7   FLOPPY DRIVE MENU

――――――― PR4050 SCSI TESTER CURRENT STATUS ―――――――

| DRV | TID | COMMAND DESCRIPTOR BLOCK | | | | | | STATUS | MESSAGE |
|---|---|---|---|---|---|---|---|---|---|
| RDY | 0 | 03 | 00 | 00 | 00 | FF | 00 | 00H | 00H |
| CYLINDERS | HEADS | SECTORS | | BLKSIZE | | READCAP | | SKEY | ASENSE |
| 1658 | 15 | 54 | | 512 | | 14138CH | | 00H | 00H |
| COMMAND EXECUTION REPORT | | | | | | | | | VEN ID |
| COMMAND COMPLETE | | | | | | | | | SIEMENS |

```
6 CDB SCSI COMMANDS              SELECT COMMAND:              03:48:42 PM

0   STOP DRIVE                   I    INQUIRY
1   SPIN DRIVE                   Z    REZERO UNIT
2   TEST DRIVE READY             S    SEEK
3   REQUEST SENSE                F    FORMAT UNIT
4   MODE SENSE (PF ONLY)         R    READ
5   MODE SELECT                  W    WRITE
6   RESERVE UNIT                 A    REASSIGN BLOCKS
7   RELEASE UNIT                 E    ENTER COMMAND MANUALLY
8   SEND DIAG/SELF TEST          B    REPORT SCSI BUS ACTIVITY
9   RECEIVE DIAG RESULTS         X    RETURN TO MAIN MENU
```

FIG.13

──────── PR4050 SCSI TESTER CURRENT STATUS ────────

| DRV | TID | COMMAND DESCRIPTOR BLOCK | | | | STATUS | MESSAGE |
|---|---|---|---|---|---|---|---|
| RDY | 0 | 03 00 00 00 FF 00 | | | | 00H | 00H |
| CYLINDERS | HEADS | SECTORS | BLKSIZE | READCAP | | SKEY | ASENSE |
| 1658 | 15 | 54 | 512 | 14138CH | | 00H | 00H |
| COMMAND EXECUTION REPORT | | | | | | VEN ID | |
| COMMAND COMPLETE | | | | | | SIEMENS | |

10 CDB SCSI COMMANDS                SELECT COMMAND:

0  SEEK EXTENDED              R  READ CAPACITY
1  WRITE EXTENDED             D  READ DEFECT LIST
2  READ EXTENDED              E  ENTER COMMAND MANUALLY
3  WRITE AND VERIFY           B  REPORT SCSI BUS ACTIVITY
4  VERIFY                     I  RETURN TO MAIN MENU
5  WRITE BUFFER
6  READ BUFFER
7  WRITE LONG
8  READ LONG

―――――――――――PR4050 SCSI TESTER CURRENT STATUS―――――――――――

| DRV | TID | COMMAND DESCRIPTOR BLOCK | STATUS | MESSAGE |
|---|---|---|---|---|
| RDY | 0 | 03 00 00 00 00 FF 00 | 00H | 00H |

| CYLINDERS | HEADS | SECTORS | BLKSIZE | READCAP | SKEY | ASENSE |
|---|---|---|---|---|---|---|
| 1658 | 15 | 54 | 512 | 14138CH | 00H | 00H |

| COMMAND EXECUTION REPORT | VEN ID |
|---|---|
| COMMAND COMPLETE | SIEMENS |

FIG. 15

TESTER FUNCTIONS

SELECT FUNCTION: _____    1 RETURN TO MAIN MENU

09:24:12 PM

0 INITIALIZE NV RAM
1 DISPLAY REV LEVEL
2 SET DATE AND TIME
3 SET SCSI COMMAND TIME OUT
4 TURN PRINT SCREEN ON/OFF
5 SET BAUD RATE
6 TOGGLE PRINT TO RS232/PRINTER

---PR4050 SCSI TESTER CURRENT STATUS---

| DRV | TID | COMMAND DESCRIPTOR BLOCK | | | STATUS | MESSAGE |
|---|---|---|---|---|---|---|
| RDY | 0 | 03 00 00 00 FF 00 | | | 00H | 00H |
| CYLINDERS | HEADS | SECTORS | BLKSIZE | READCAP | SKEY | ASENSE |
| 1658 | 15 | 54 | 512 | 14138CH | 00H | 00H |
| COMMAND EXECUTION REPORT | | | | | | VEN ID |
| COMMAND COMPLETE | | | | | | SIEMENS |

PORTABLE TESTER (QUALIFIER) FOR EVALUATING AND TESTING SCSI INTERFACE MAGNETIC DISC DRIVES IN ACCORDANCE WITH ANSI SCSI-A AND SCSI-2 DEFINITIONS

BACKGROUND OF THE INVENTION

As stated in U.S. Pat. No. 4,843,544, the problem of transferring data from peripheral storage media such as punched cards, punched tape, magnetic tape, magnetic drums, magnetic discs and optical discs, has always been a major consideration as the technology of automatic data processing systems has advanced.

With the completion of the ANSI X3.131-1986 standard for the Small Computer System Interface (SCSI), the small computer industry set the goals for the next generation of small system peripheral interfaces and the interaction of peripheral storage media with such interfaces. The SCSI standard paves the way for a high data transfer rate between the SCSI bus and a peripheral storage device, such as a Winchester Disc System.

The Small Computer System Interface (SCSI-1) protocol is fully described in the American National Standard ANSI X3.131-1986 publication available from the American National Standards Institute, Inc., 1430 Broadway, New York, N.Y. 10018; and in the American National Standard Small Computer System Interface-2 (SCSI-2) 1991 publication, available from Global Engineering Documents, 2805 McGain, Irvine, Calif., 92714.

Generally, up to eight devices including small computers and peripherals, may be coupled to the SCSI bus. The SCSI bus includes data and control lines with bus protocol facilitating information transfer between the devices and the bus.

Soon after the completion of the ANSI X3.131 standard for small computer system interface (SCSI) various designs for SCSI disc controllers and drives began to be implemented. testers for such disc drives are presently on the market. Two companies, namely, ADAPTEC and FLEXSTAR are presently marketing programmable testers for testing SCSI interface disc drives. These testers are relatively simple and straightforward to program, but they are difficult to operate and interpret, especially for novice operators and those unfamiliar with programming.

The tester (or qualifer) of the present invention is constructed to make the abstract nature of SCSI small computer systems interface definition easier to understand and work with. When compared with available conventional SCSI PC Tools and development systems that tend to make SCSI definitions more complex and more difficult to understand, the qualifier of the present invention is designed to make the SCSI definition simpler. The qualifier of the invention uses a simple ami built-in concept which allows an operator quickly to become familiar with the SCSI Interface Protocol and command structure. and enables the operator to use the qualifier with built-in canned diagnostics to execute complex performance tests on a target with just a few key strokes.

The present invention provides a qualifier for SCSI magnetic disc drives, magnetic tape drives, optical drives and the like, which, in the embodiment to be described, is a portable stand-alone unit for testing and evaluating SCSI direct access and sequential access devices, in accordance with ANI SCSI-1 and ANSI SCSI-2 definitions. The qualifier of the present invention is completely menu driven, both for a novice and interactive (operation) users. All commands are executed with a single keystroke.

All of the definitions and vocabulary of the ANSI SCSI specifications contained in the documents referred to above are incorporated into the software of the qualifer of the invention. The drive being tested sends message and error codes to the qualifer, which has the ANSI definitions and vocabulary built into its software, so that the qualifer responds to the codes as is the case with the prior art machines, but also the corresponding ANSI definitions in plain language.

The qualifier of the invention includes a cathode ray tube (CRT) which displays a multiplicity of individual screens under the keyboard control of the operator, and which directly displays the ANSI defined names, labels and error messages in plain language for immediate comprehension by the operator.

Each screen is divided into two areas: (A) "Work Space" where all menus, data, error messages are displayed and (B) "Status Window" which displays the current status of the SCSI bus and of the qualifier. A built-in easy to use editor allows convenient access to command DESCRIPTOR BLOCKS, MODE SELECT parameters, FORMAT and DEFECT LISTS and HEADERS, and SEND DIAGNOSTIC sub-command headers. A built-in bus analyzer timing capability with high resolution permits the operator to measure all key timing events.

All menus, data, error messages, and the like, are formatted onto separate screens which may be readily selected by the operator and individually displayed by the CRT. Unlike the prior art testers, the flood of binary information flowing back and forth on the SCSI bus between the qualifier and the disc drive is interpreted by an internal data processor and produced on each screen in a plain language format which makes the abstract nature of SCSI definition easier to understand and work with, as compared with the prior art testers.

The qualifier of the invention is constructed to use a simple built-in feature which allows the operator quickly to become familiar with SCSI protocol and command structure, and enables the operator to execute complex performance tests on the equipment under test with relatively few keystrokes.

Even the novice operator can operate the qualifier of the invention and be furnished with all of the required data directly, without involving the need for reference to tables, or any particular skill on the part of the operator, in interpreting the data.

Convenient operations makes the qualifier of the invention easily adaptable for simple performance checks of a disc drive, or under equipment under test, by a low level technician; or to more sophisticated tests of the disc drive by a test engineer familiar with the SCSI definitions. In either case, no programming skills are required to operate the qualifier of the invention.

The principal objective of the present invention is to provide a SCSI qualifier constructed to reduce the confusion and effort previously required by the operator to evaluate and test SCSI devices. Wherever applicable, text and error messages on each screen displayed by the CRT 14 are in plain language identical to the ANSI SCSI-2 definitions contained in the standard documents referred to above.

BRIEF DESCRIPTION OF THE DRAWINGS

FIG. 12 is a representation of a main menu screen adapted to be displayed by the Cathode Ray Tube of the qualifier;

FIG. 13 is a representation of a 6 CDB SCSI COMMANDS screen adapted to be displayed by the Cathode Ray Tube of the qualifier;

FIG. 14 is a representation of a 10 CDB SCSI COMMANDS screen adapted to be displayed by the qualifier; and FIG. 15 is a representation of a Tester Functions screen adapted to be displayed by the qualifier.

DETAILED DESCRIPTION OF THE ILLUSTRATED EMBODIMENT

Figure 1:
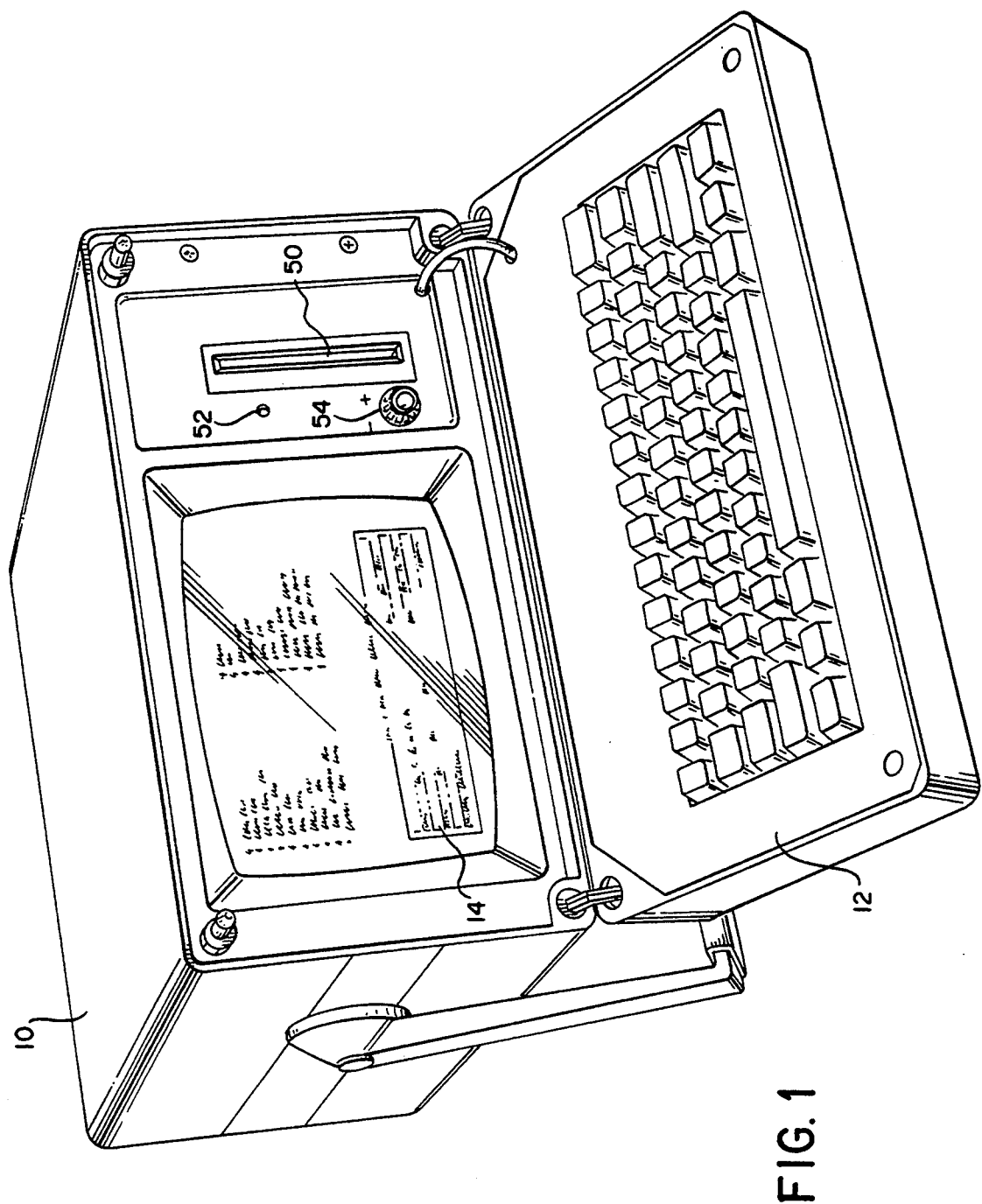
FIG. 1 is a perspective view of the qualifier of the invention, in one of its embodiments.

The qualifier of the invention, as shown in FIG. 1, is housed in a portable housing 10 with a hinged turned-down QWERTY keyboard 12. The qualifier includes a built-in CRT display 14, and a XT/AT compatible floppy disc drive 16 (FIG. 2) for storing peripheral data. The embodiment of the qualifier of the invention to be described, for example, is a 68000 based modular machine with resident software stored in 128K of EPROM 18, which is expandable to 256K.

Figure 2:
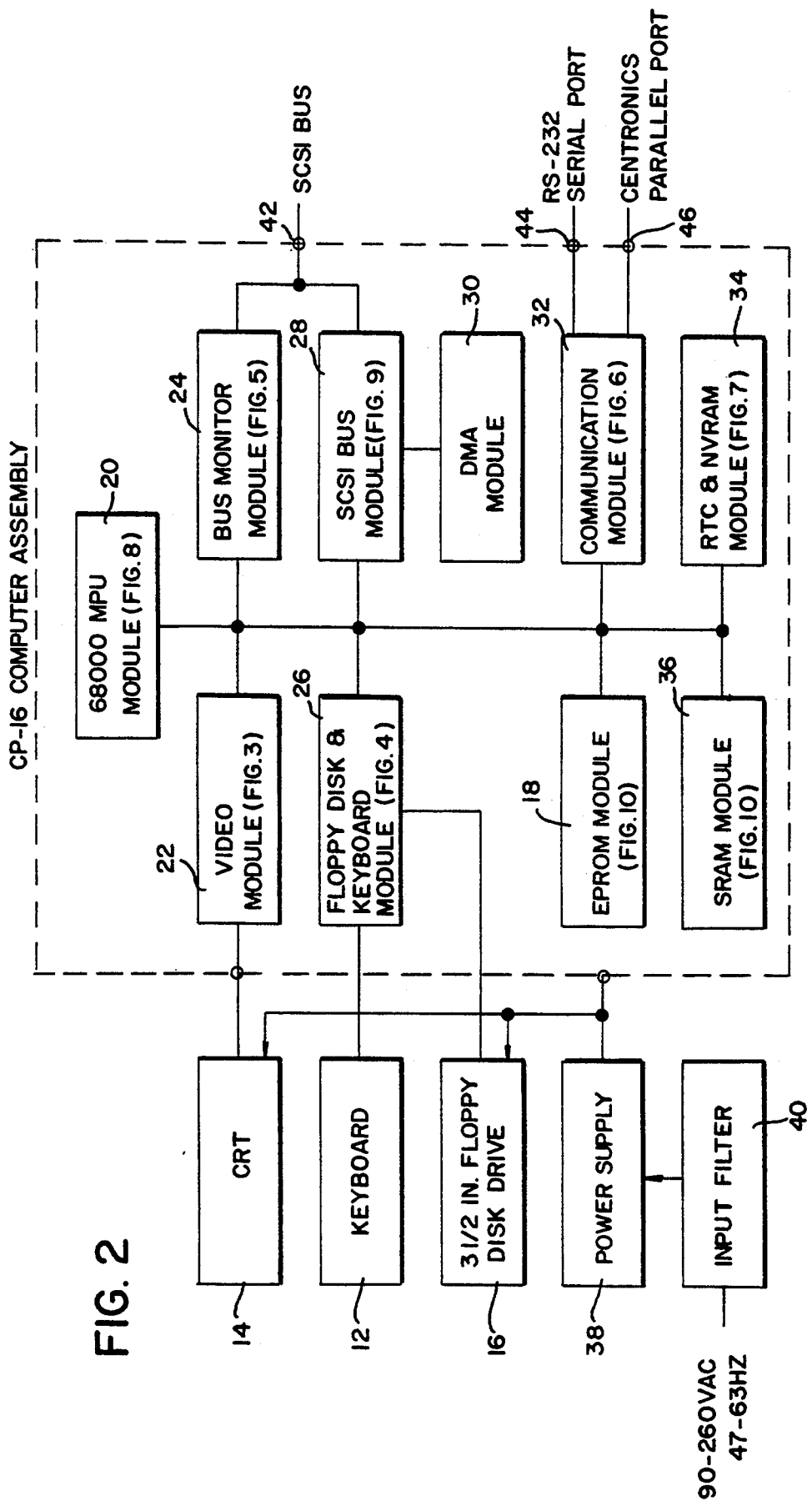
FIG. 2 is a block diagram of the internal electronic components and modules of the qualifier of FIG. 1.
Figure 3:
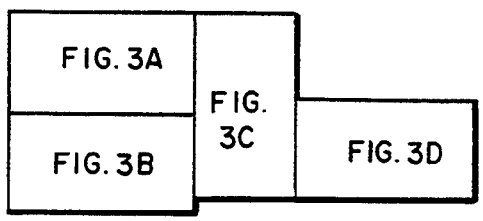
FIGS. 3A-3D collectively represent a schematic circuit diagram of a video module shown in block form in FIG. 2, and these FIGURES are collectively grouped as shown in FIG. 3.
Figure 4:
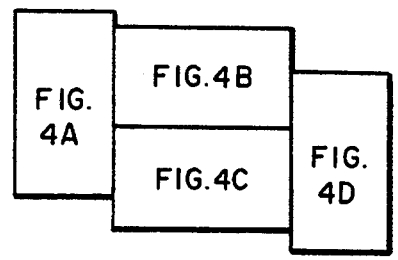
FIGS. 4A-4D collectively represent a schematic circuit diagram of a floppy driver keyboard module shown in block form in FIG. 2, and these FIGURES are collectively grouped as shown in FIG. 4.
Figure 5:
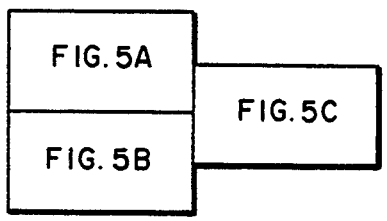
FIGS. 5A-5C collectively represent a schematic circuit diagram of a bus monitor shown in block form in FIG. 2, and these FIGURES are collectively grouped as shown in FIG. 5.
Figure 6:
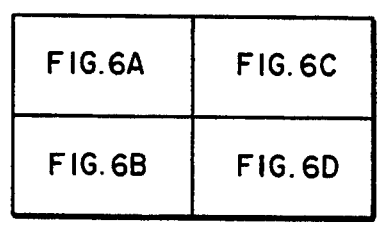
FIGS. 6A-6D collectively represent a schematic circuit diagram of a communication module shown in block form in FIG. 2, and these FIGURES are collectively grouped as shown in FIG. 6.
Figure 7:
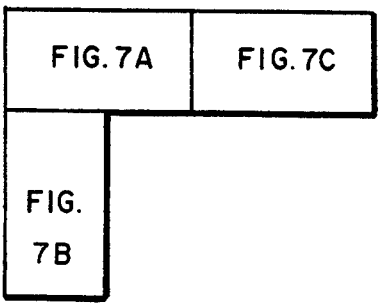
FIGS. 7A-7C collectively represent a schematic circuit diagram of an RTC and NVRAM module shown in block form in FIG. 2, and these FIGURES are collectively grouped as shown in FIG. 7.
Figure 8:
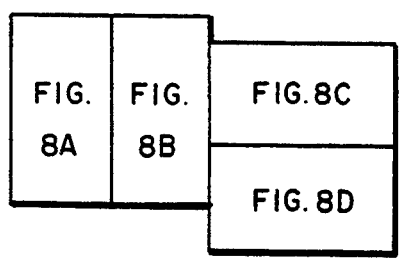
FIGS. 8A-8D collectively represent a schematic circuit diagram of a microprocessor shown in block form in FIG. 2 and these FIGURES are collectively grouped as shown in FIG. 8.
Figure 9:
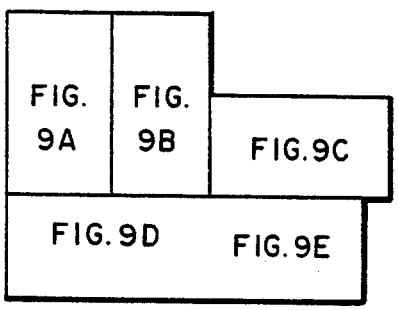
FIGS. 9A-9E collectively represent a schematic circuit diagram of an SCSI module shown in block form in FIG. 2, and are collectively grouped as shown in FIG. 9.

As shown in FIG. 2, the internal electronic modules of the qualifier make up a CP16 computer assembly. These include a 68000 microprocessor module 20, a video module 22, a bus monitor module 24, a floppy disc and keyboard module 26, and SCSI bus module 28, a DMA module 30, a communication module 32, an RTC and NVRAM module 34, and a SRAM module 36. A power supply 38 and input filter 40 are also provided. All of the modules are interconnected in the manner shown in FIG. 2.

The bus monitor module 24 and SCSI bus module 28 are connected to two SCSI bus connectors collectively indicated as 42, and which are located on the rear panel of the qualifier of FIG. 1. Each of the SCSI connectors is a two-row twenty-five pin connection IDC connector commonly used in conjunction with flat ribbon cable. The two connectors are connected in parallel.

The qualifier also includes an RS-2326 serial data port 44 (FIG. 2) connected to the communication module 32, and which serves to support serial interfaced printers.

A parallel printer port 46 (FIG. 2) is also connected to the communication module 32 for connection to a compatible parallel interfaced printer. The connectors for ports 44 and 46 are located on the rear panel of the qualifier shown in FIG. 1.

The front panel of the qualifier, as shown in FIG. 1, includes a slot 50 for accessing a floppy disc to the floppy disc drive 16. A "Power On" indicator LED 52 is also provided on the front panel, as well as a brightness control 54. The nine inch display screen of CRT 14 provides a high quality displayed image. It is preferably an amber phosphorous screen with medium persistence providing viewing under a wide range of ambient light. The use of CRT display 14 provides easy viewing with a wide range of viewing angles. The video display brightness may be changed by adjusting the front panel control 54. Keyboard 12 is a full sized permanently mounted keyboard, and it is used to provide the operator input to the qualifier. To release the keyboard from its latched carry position, two buttons located on the left and right edges of the keyboard are depressed. The keyboard is permanently hinged from the lower edge of the qualifier. During use, the hinged keyboard allows easy adjustment of the keyboard slope. When not in use, the keyboard latches into its carry position to provide a compact and rugged case for carrying the unit.

The disc drive 16 (FIG. 2) is a MS-DOS format compatible 3.5" floppy disc drive. The floppy disc drive supports either the 720 Kb or 1.44 Mb formatted floppy diskettes. The local structure of the diskette allows quick and convenient exchange of data.

The qualifier of the invention provides a summary indication whenever detects it any type of SCSI Bus activity. The indicator is illuminated during periods of activity.

Figure 5A:
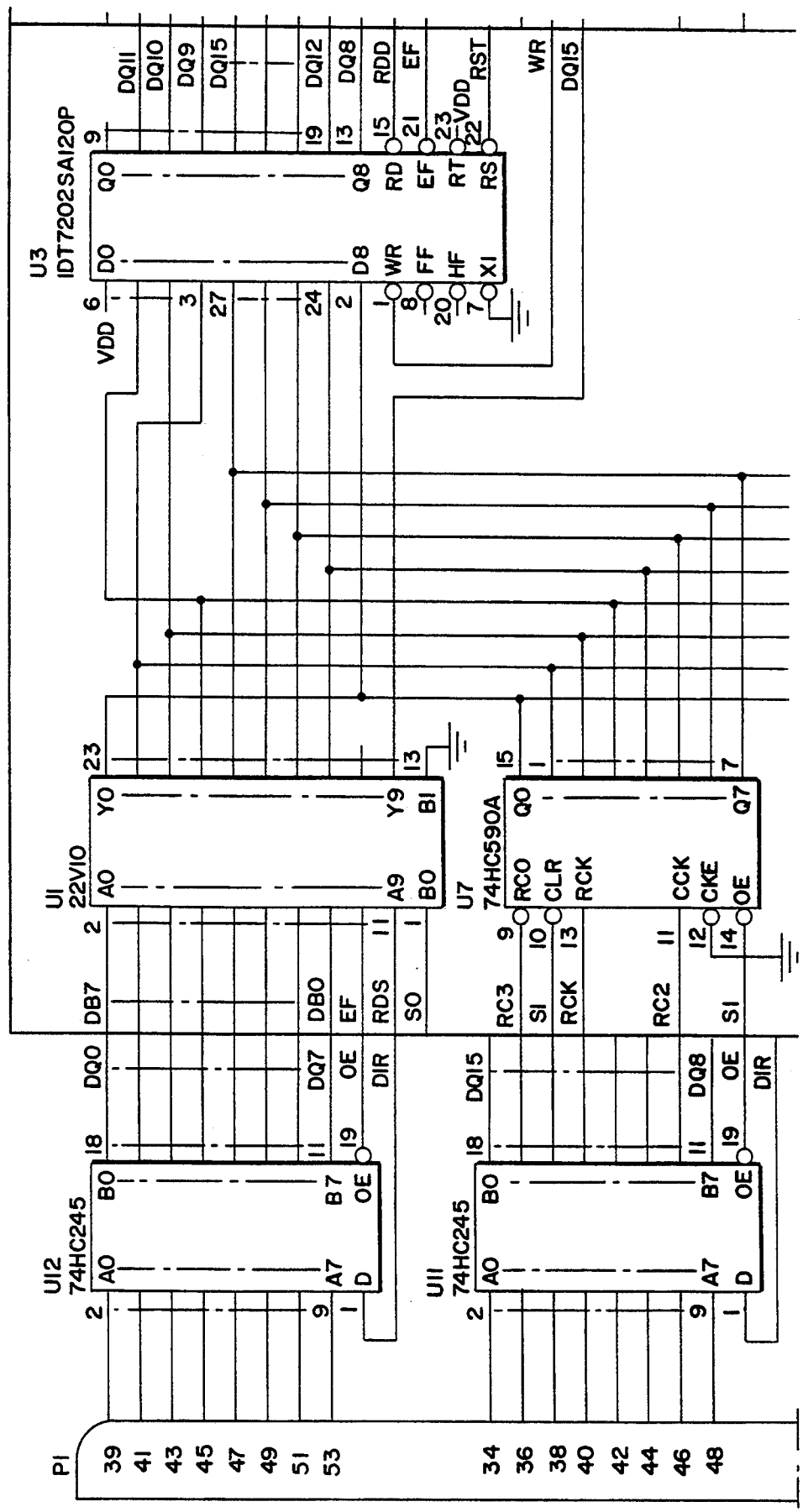
Figure 5B:
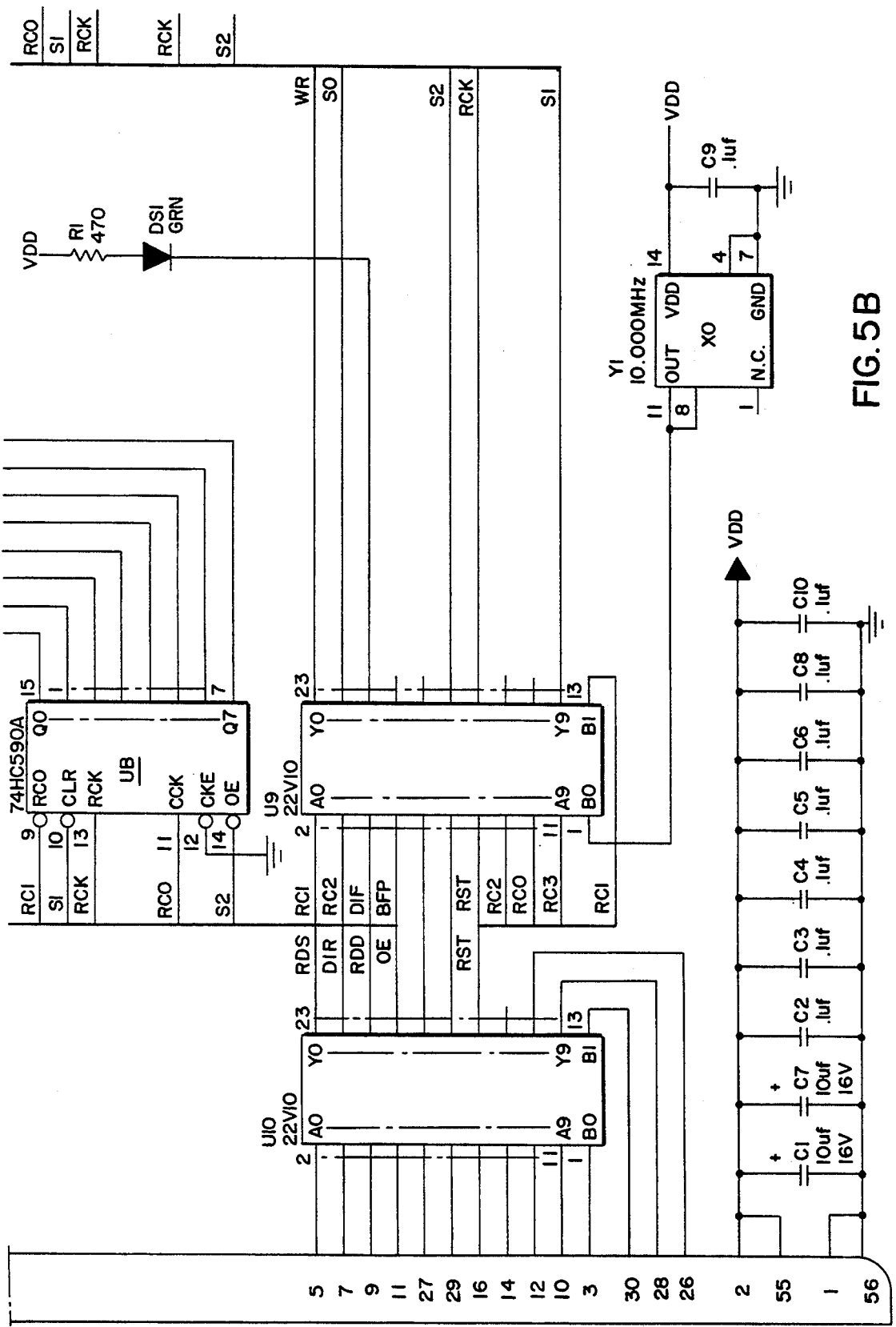
Figure 5C:
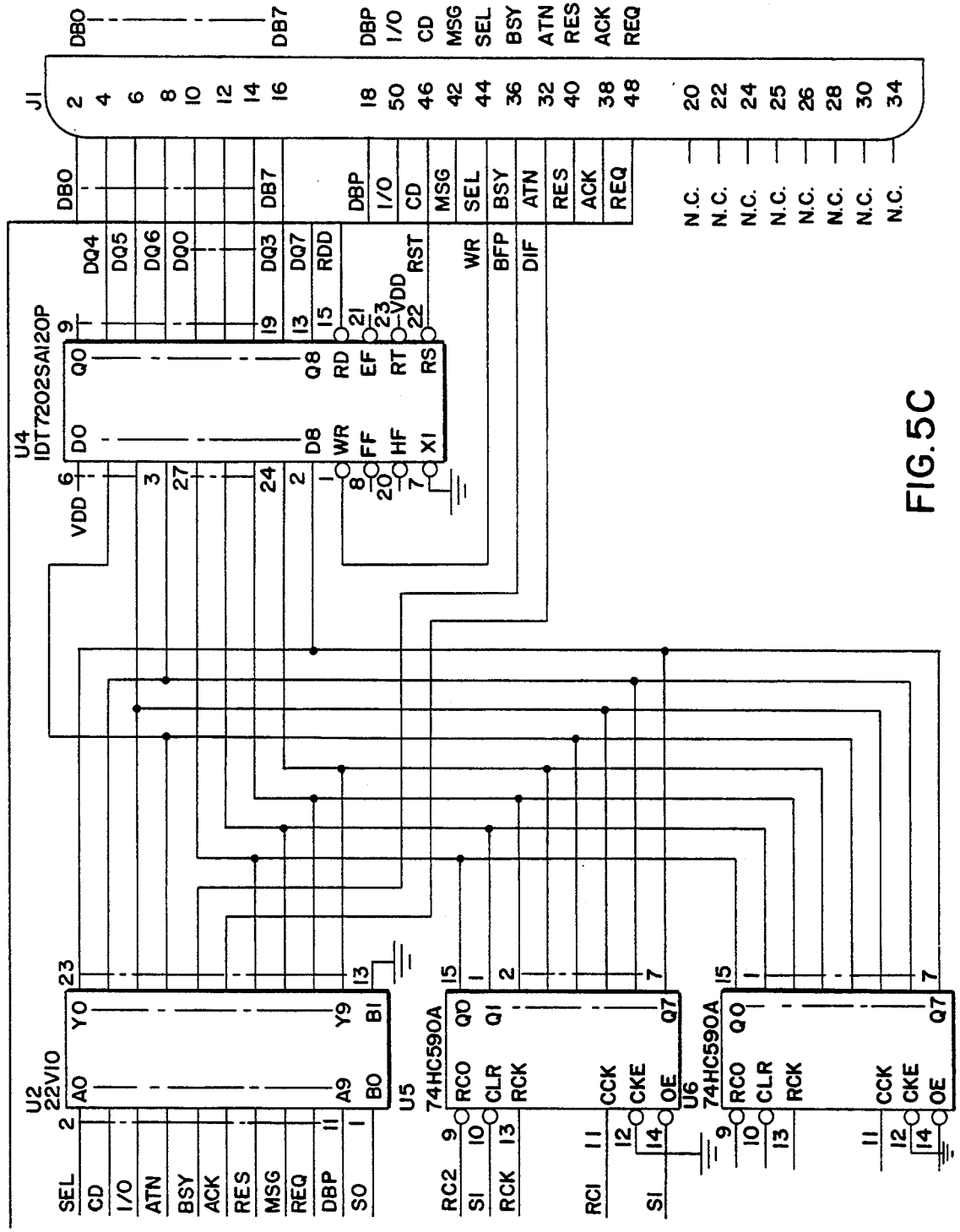
Figure 6A:
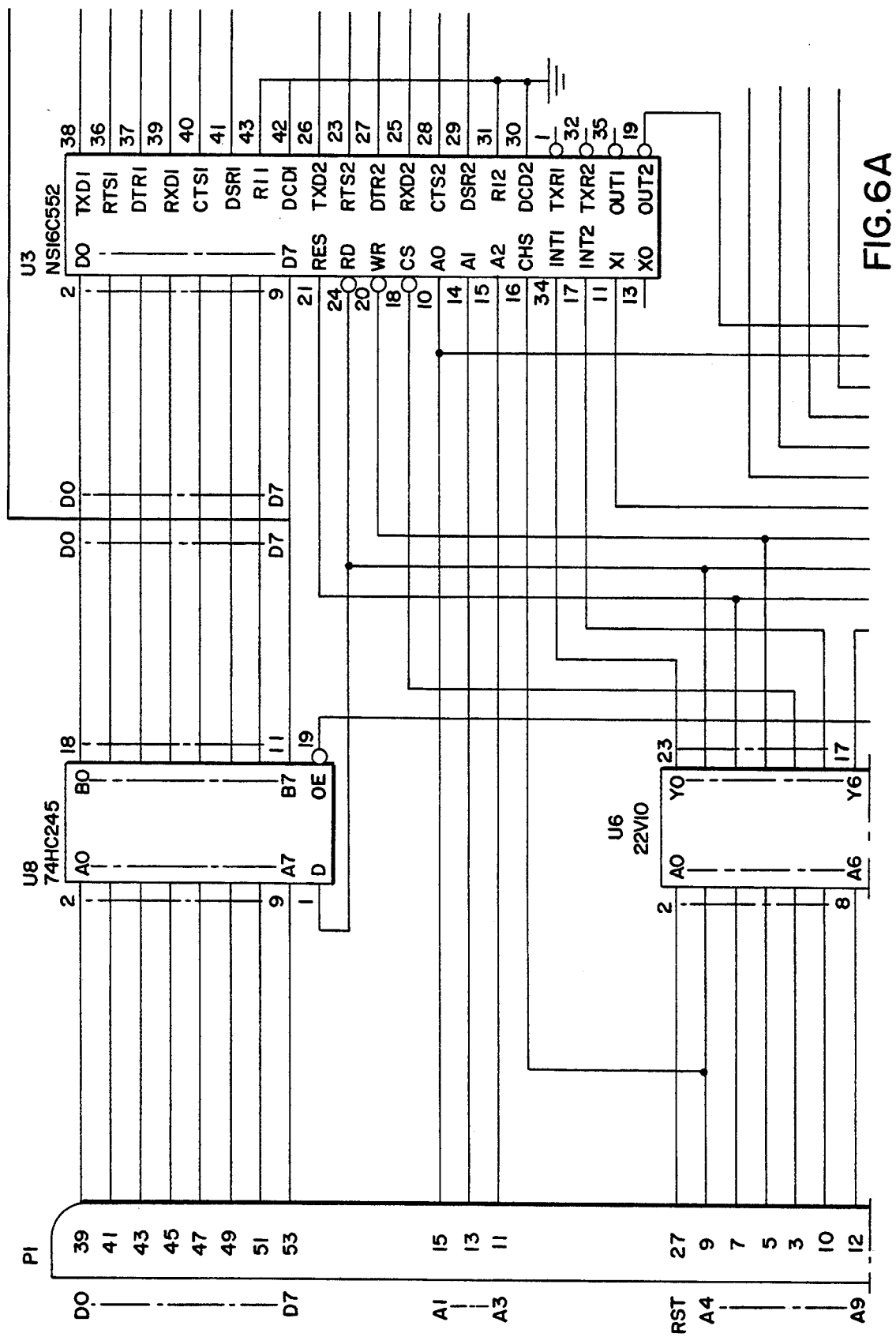
Figure 6B:
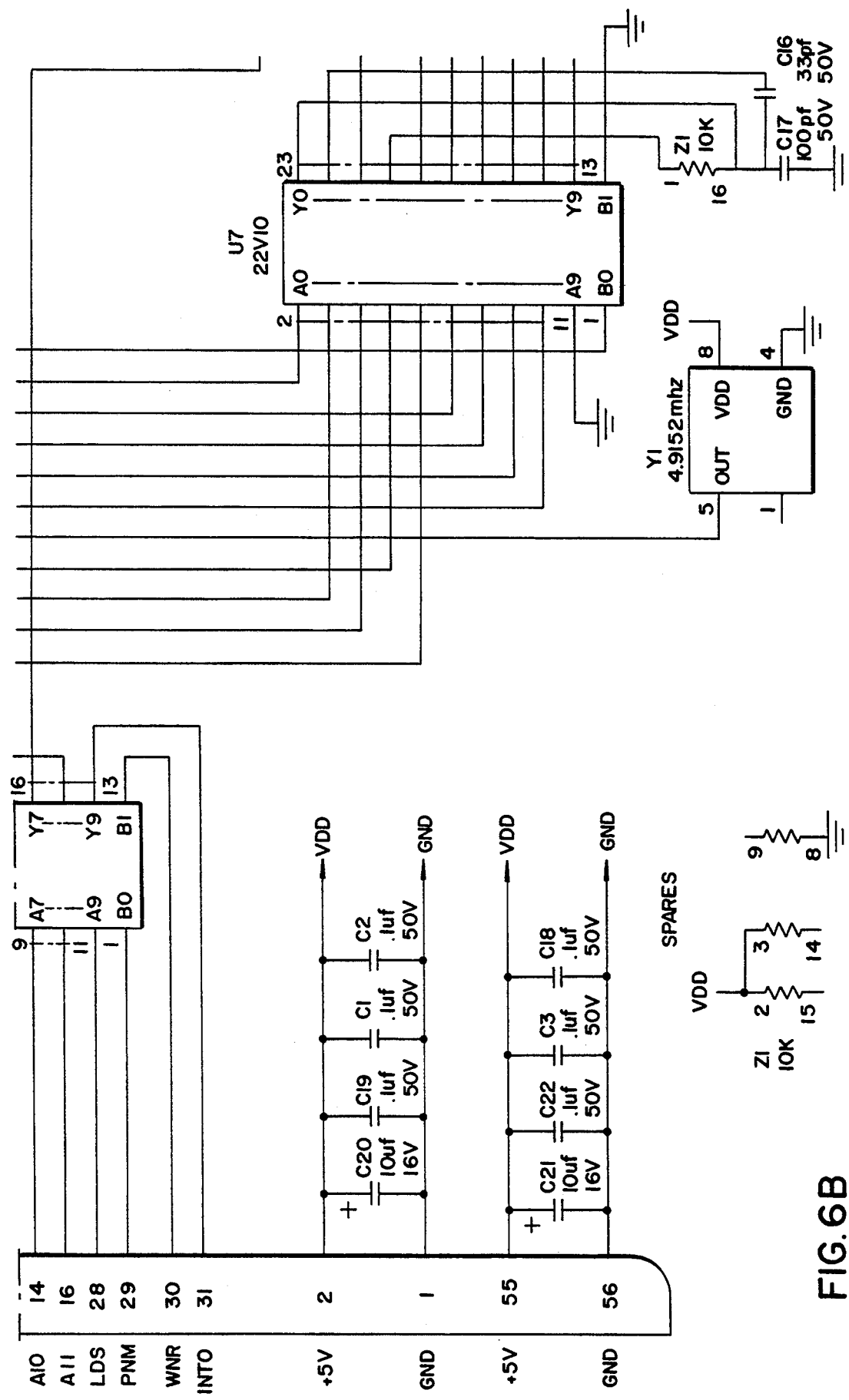
Figure 6C:
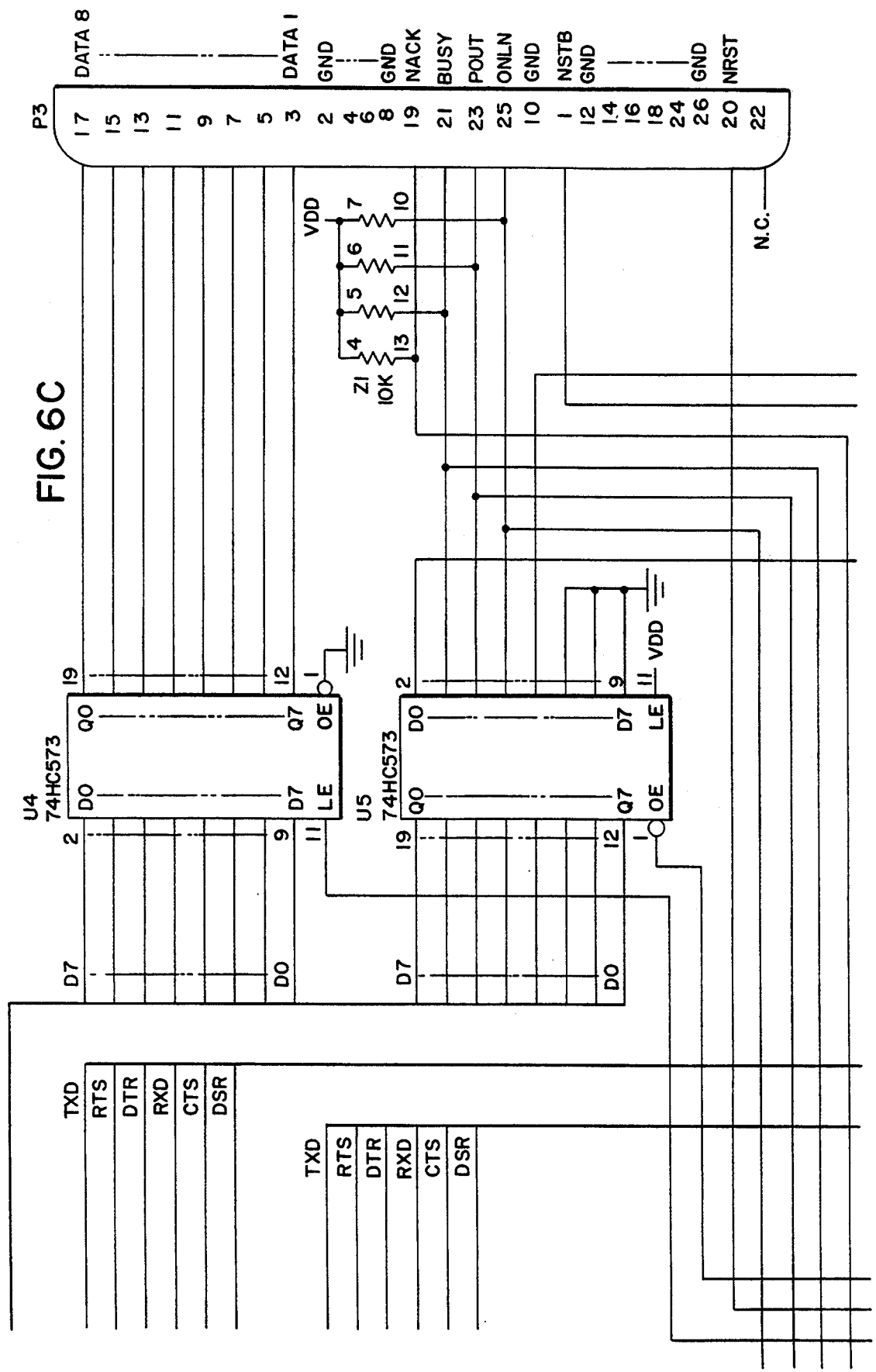
Figure 6D:
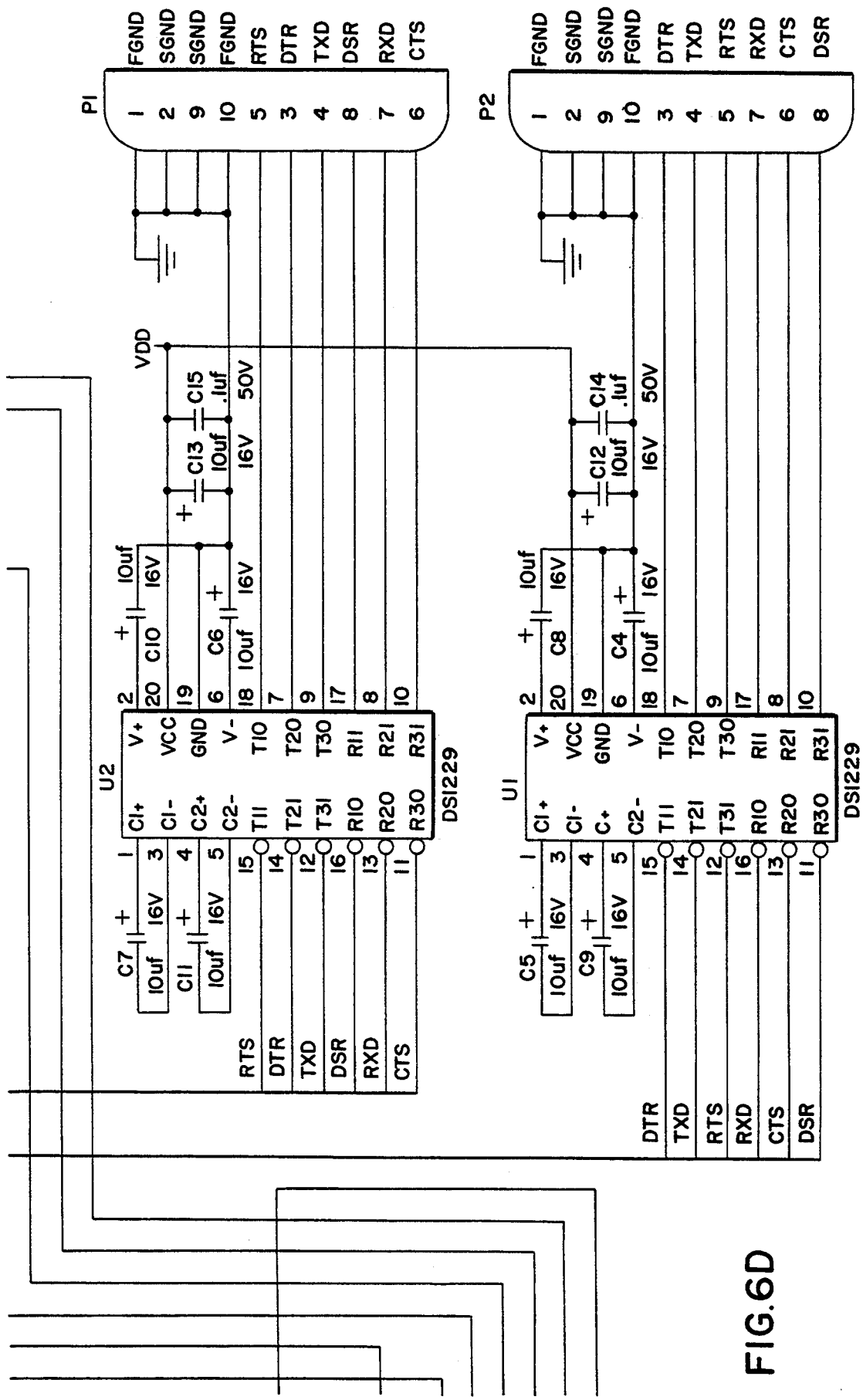
Figure 8A:
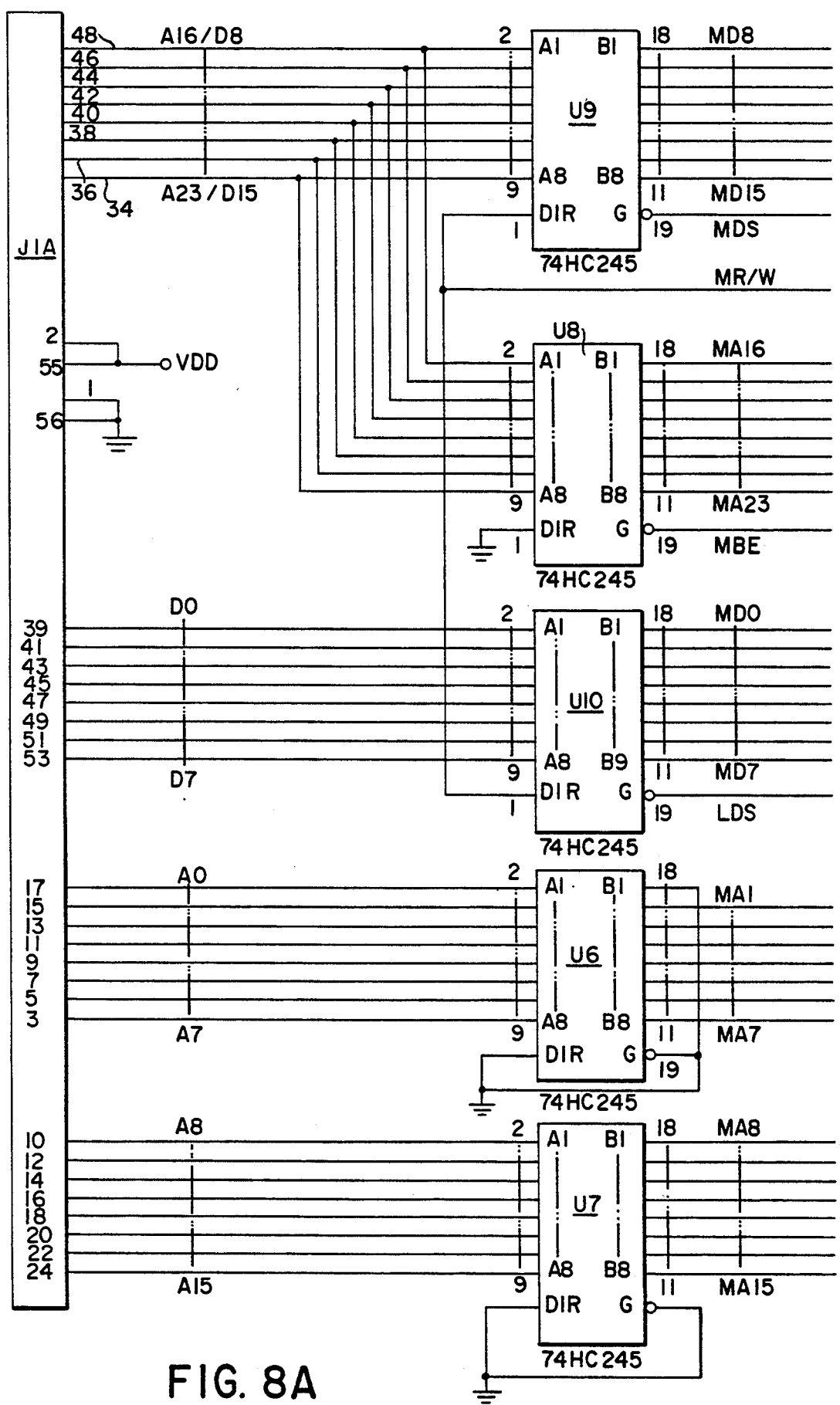
Figure 8B:
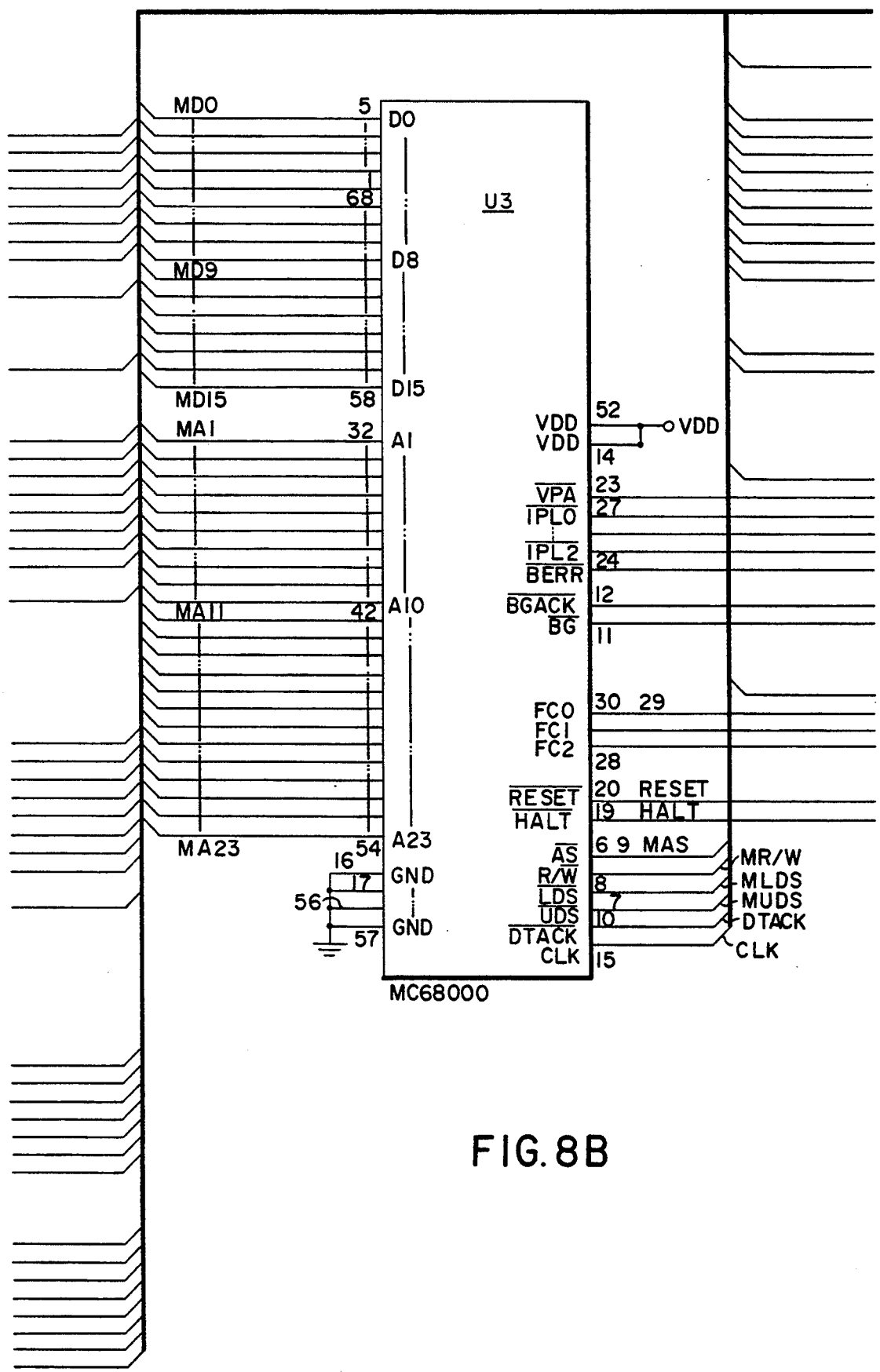
Figure 8C:
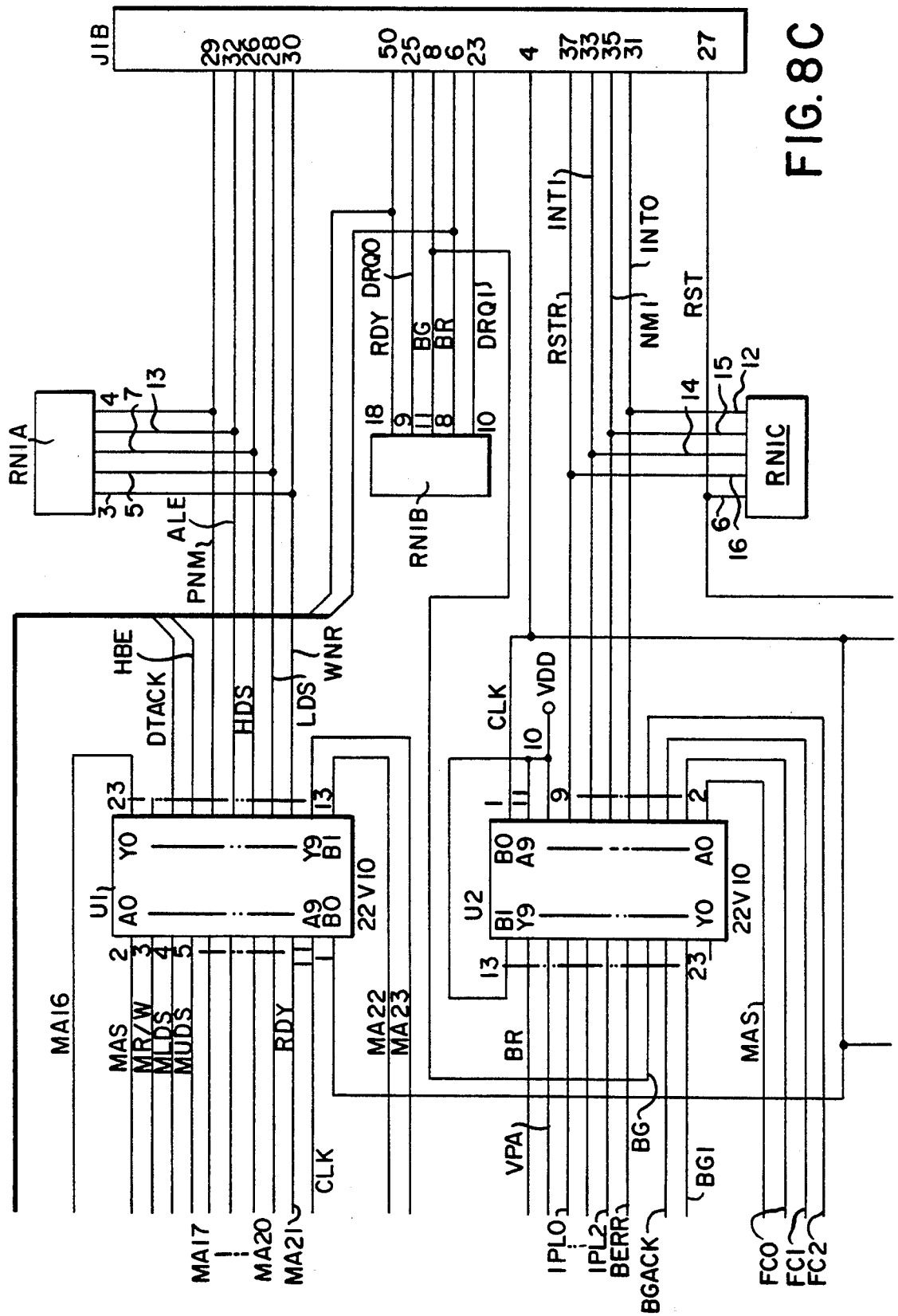
Figure 8D:
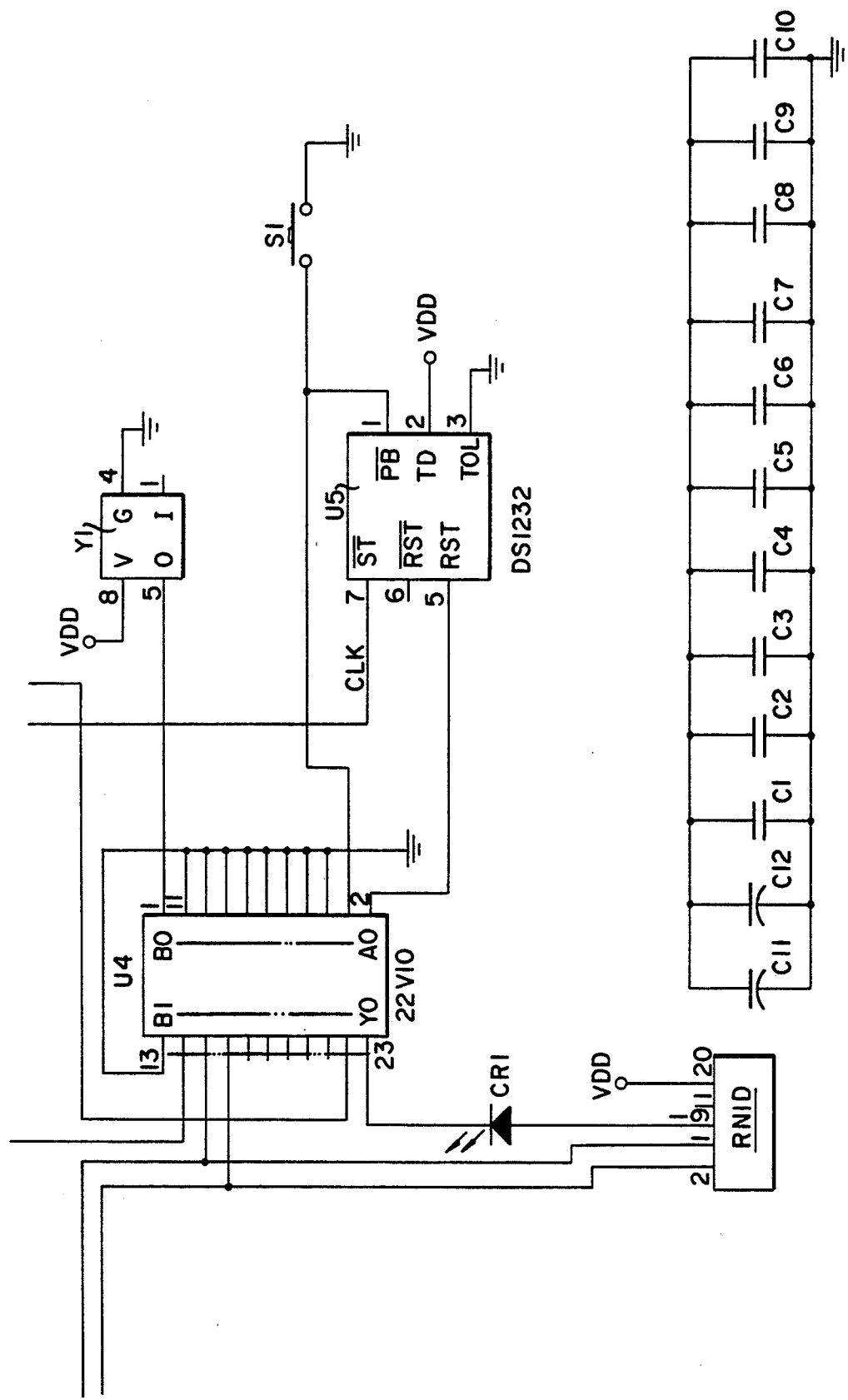
Figure 9A:
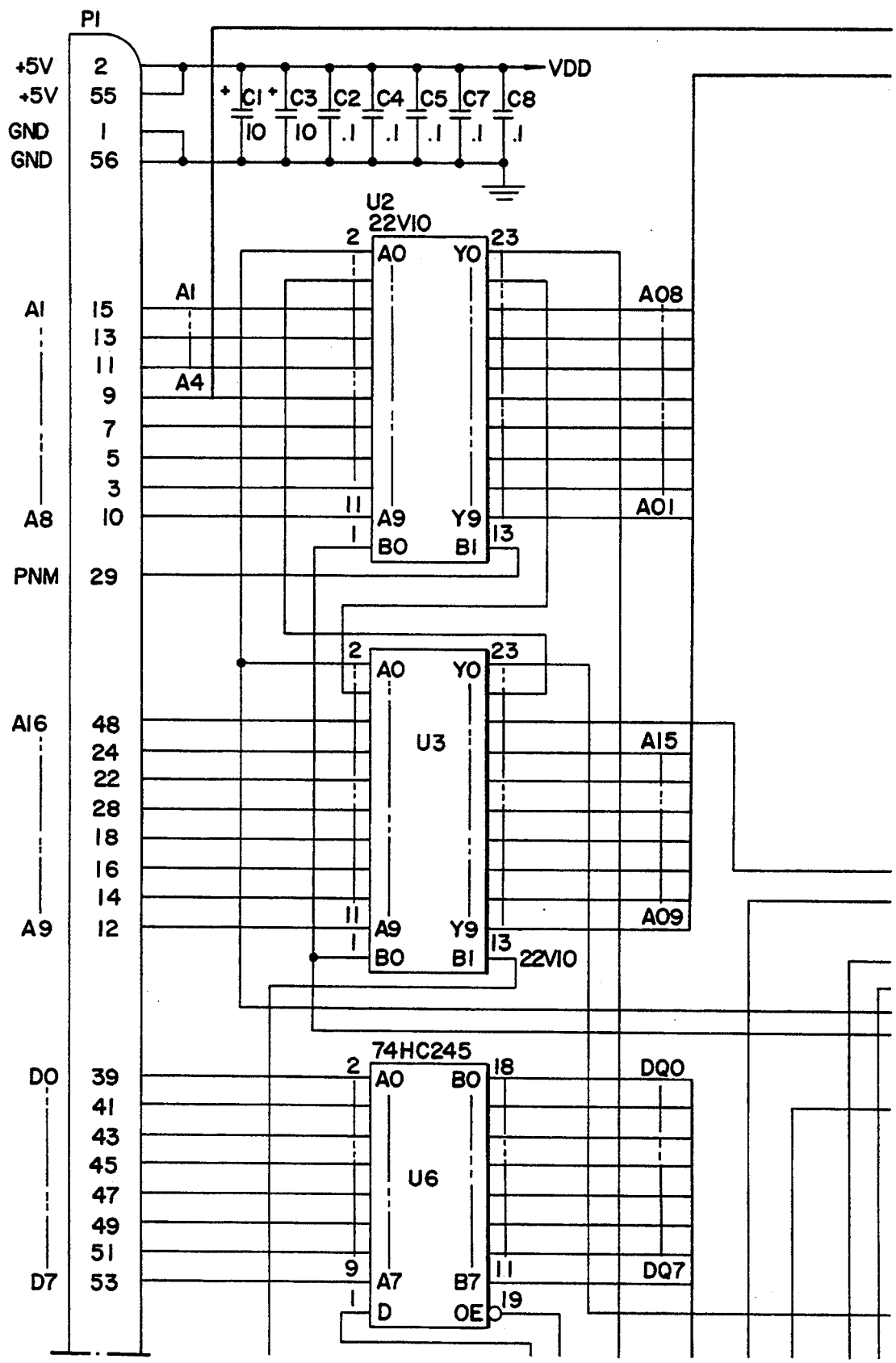
Figure 9B:
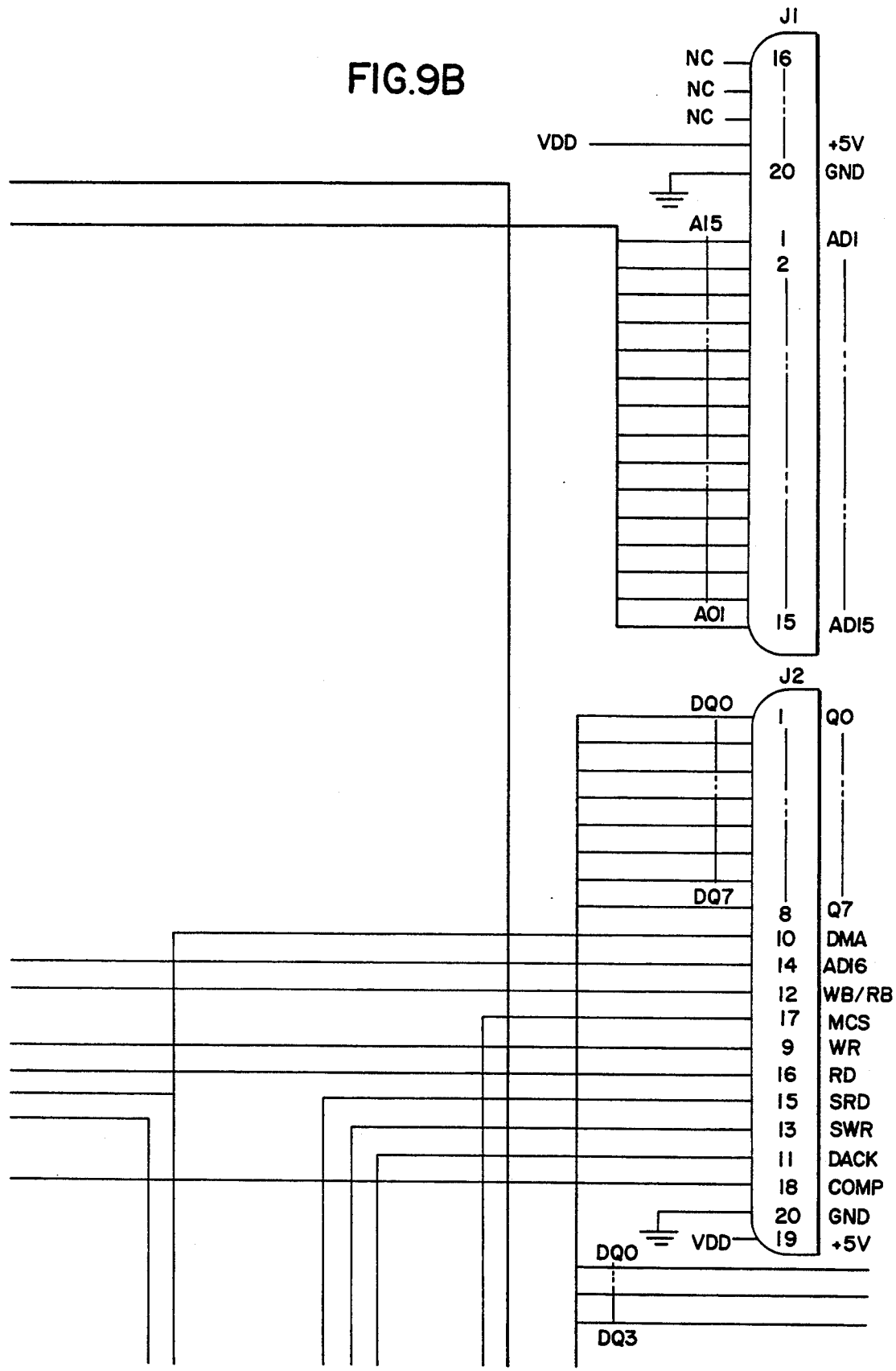
Figure 9D:
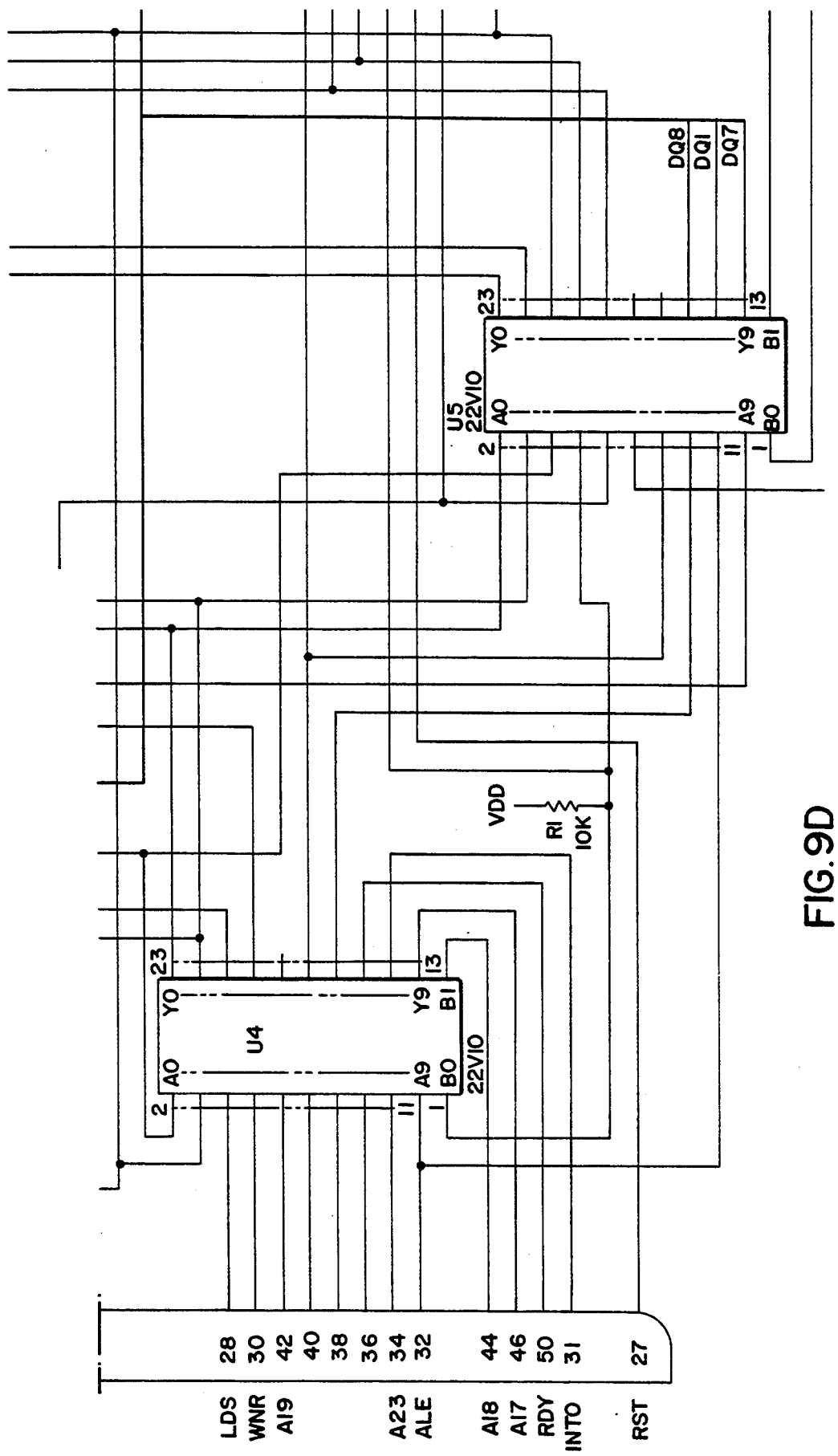
Figure 9E:
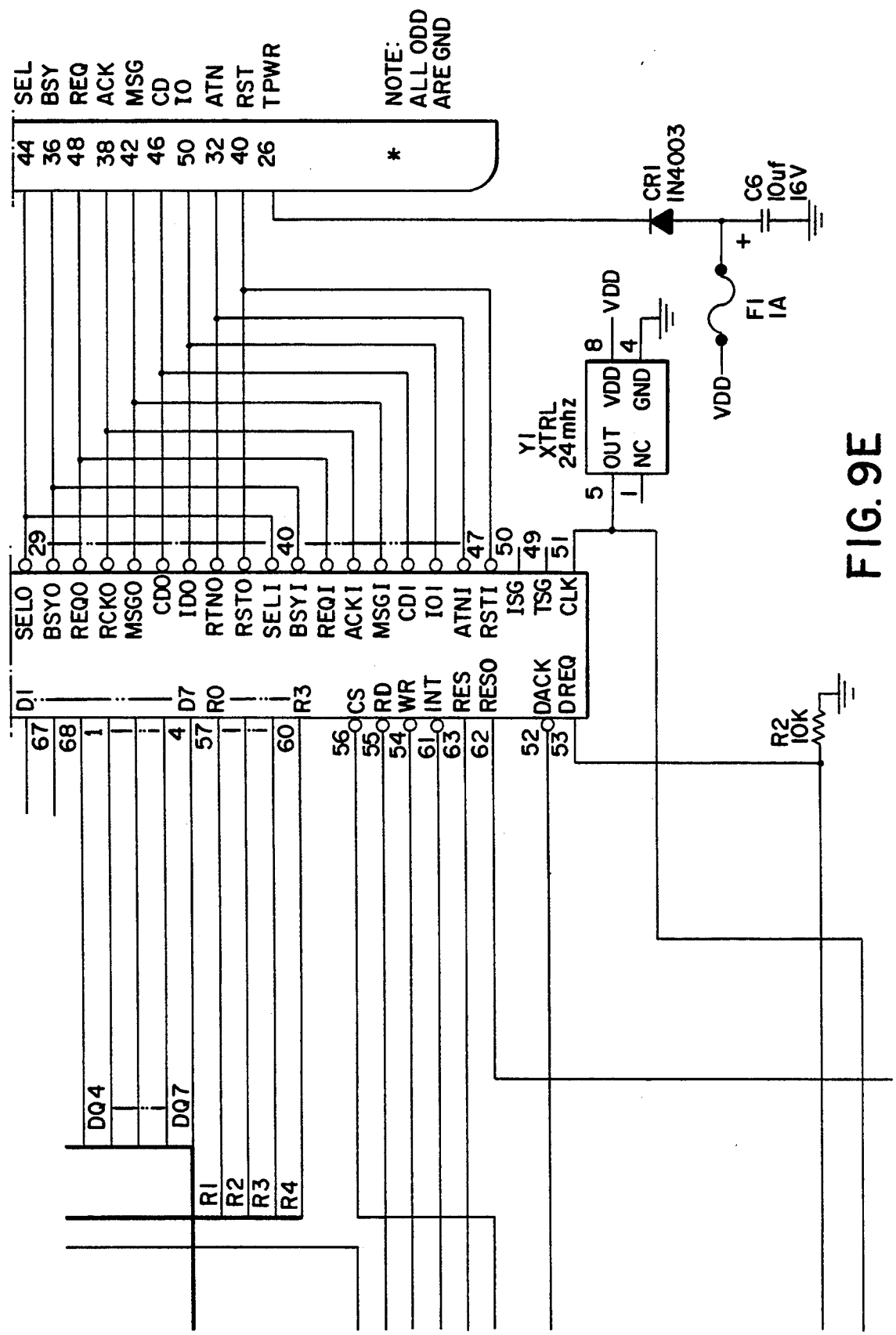

Module 20 of FIG. 2, which is shown in circuit detail in FIGS. 8A-8D contains the microprocessor and support circuitry for the computer assembly. As shown in FIG. 8B, the microprocessor is of the type designated MC 68000. Module 22, which is shown in circuit detail in FIGS. 3A-3D, is the video module of the computer assembly, and it includes the video random access memory (RAM) and drivers for the cathode ray tube (CRT) 14, as well as character fonts. Module 24 is the bus monitor module, which is shown in circuit detail in FIGS. 5A-5C. This module monitors events of the SCSI bus and stores the events in memory for the microprocessor of module 20 to look at later.

The floppy disc and keyboard module 26 contains the floppy disc drive and keyboard interface circuitry. This module is shown in circuit detail in FIGS. 4A-4D. The SCSI Bus module 28 provides interface circuitry between the SCSI bus and the microprocessor of module 20. Module 28 and DMA module 30 are shown in circuit detail in FIGS. 9A-9E and 11A-11D, respectively. The DMA module 30 provides direct memory access to transfer large blocks of data between the microprocessor and the SCSI bus memory. The communication module 30 contains interface circuitry, and is shown in circuit detail in FIGS. 6A-6D.

Figure 7A:
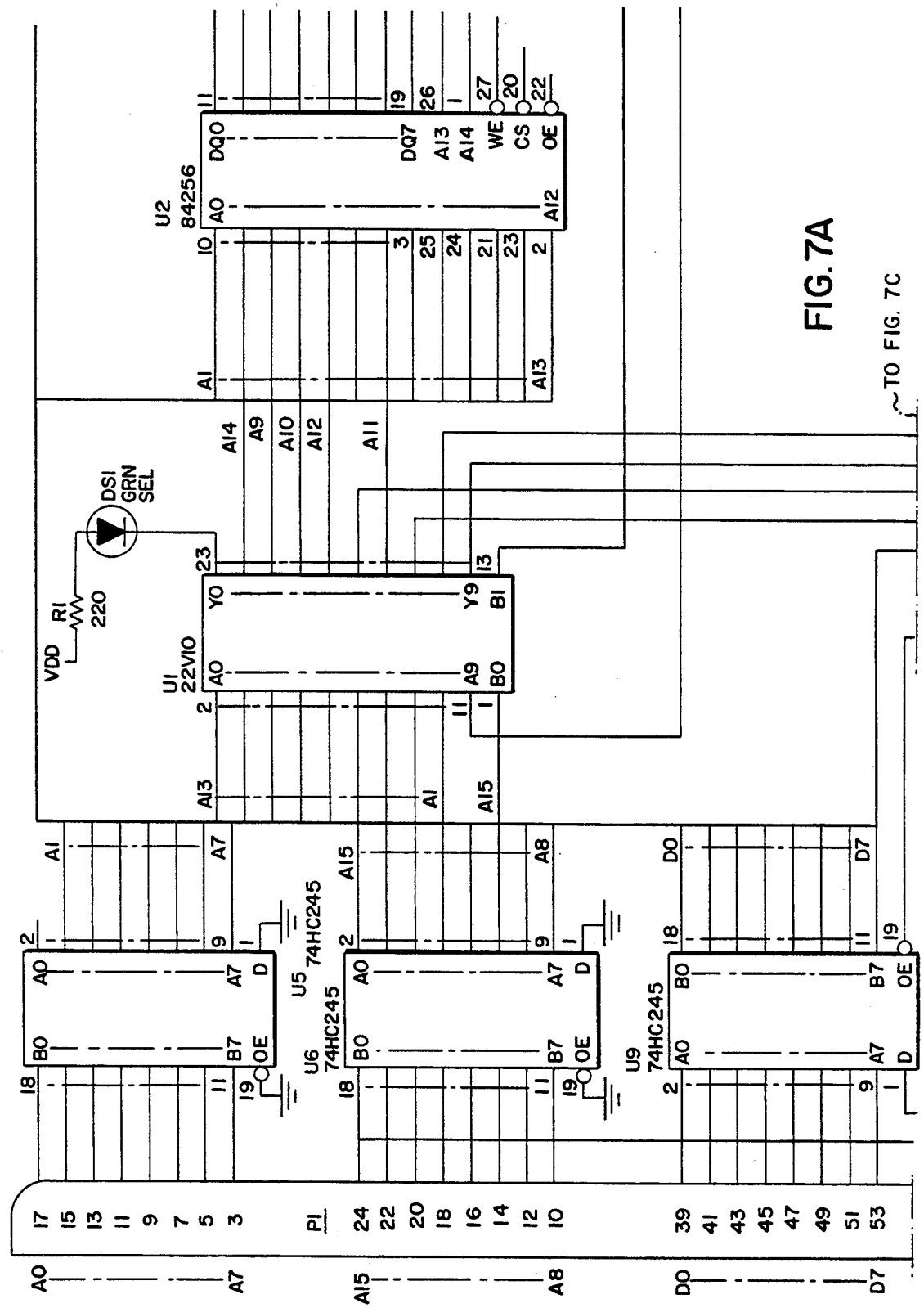
Figure 7B:
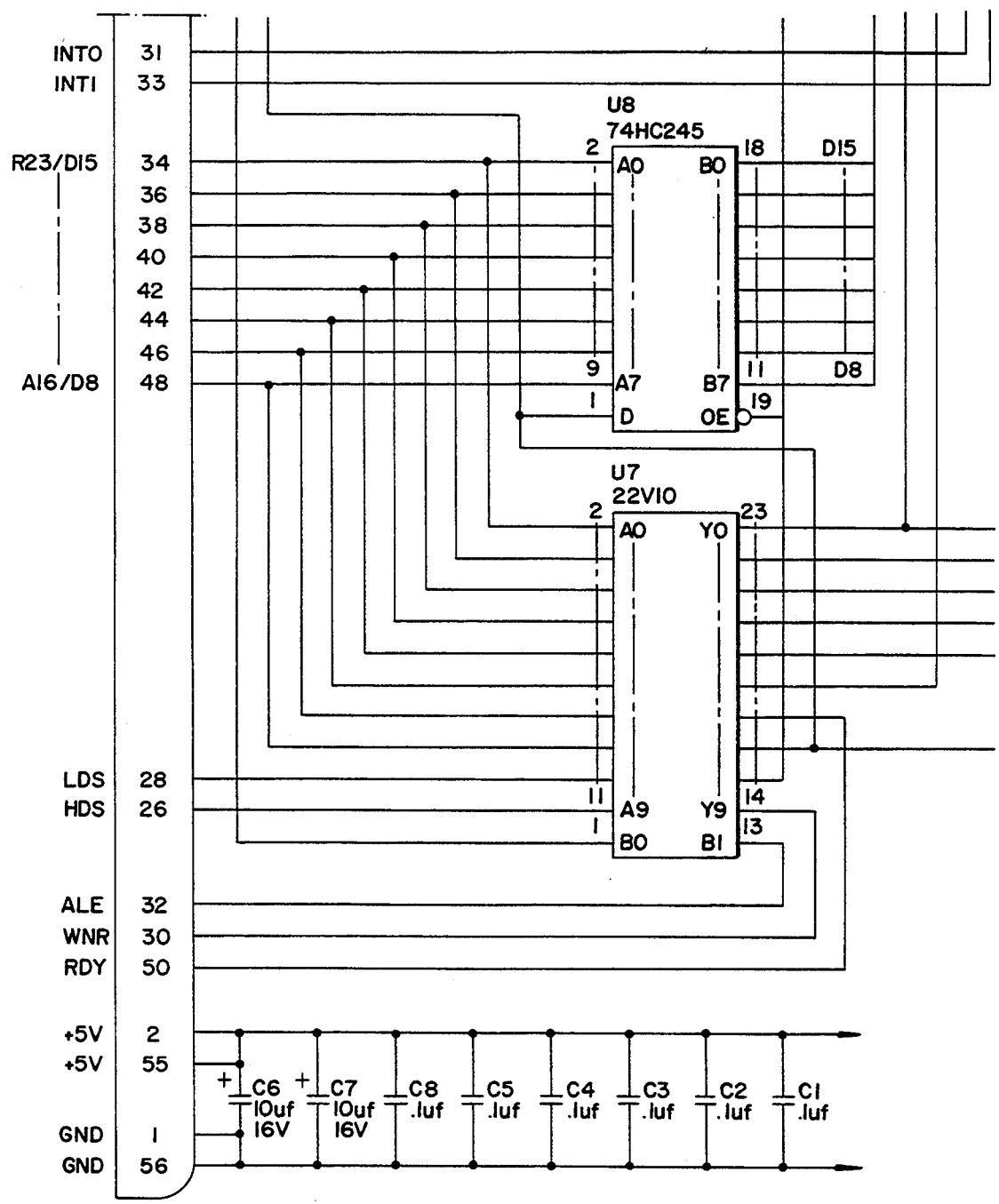
Figure 7C:
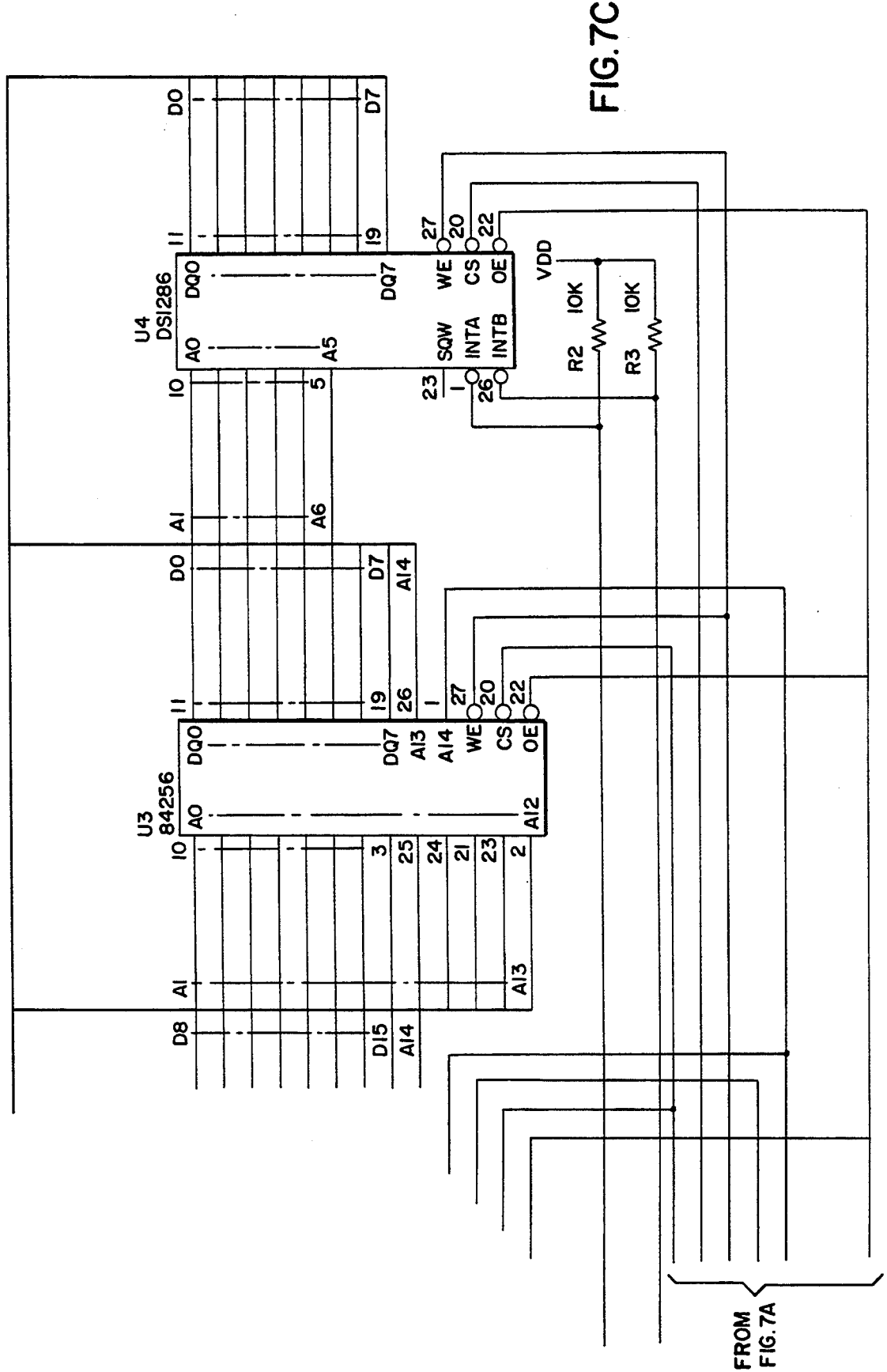

The RTC and NVRAM module 34 contains a real time clock circuit and non-volatile random access memory (RAM). The circuitry of this module is backed by a battery in order that information may be preserved in the event of power failure. This module permits the user to create programs and to store the programs in the NVRAM. The circuitry of module 34 is shown in FIGS. 7A-7C. Module 36 is a static random access memory (SRAM) module, and it is shown in circuit detail in FIGS. 10A-10C. Module 18 is a programmable read only memory (EPROM) module, and it is shown in circuit detail in FIGS. 10A-10C.

As stated above, the MPU module 20 of FIG. 2 contains the microprocessor U3 (FIG. 8B). The microprocessor is a Motorola 68HC000. The microprocessor runs the programs which operate the CP16 computer and also the SCSI qualifier. U1 (FIG. 8C) is a programmable logic integrated circuit which conditions certain outputs from the microprocessor to form certain other signals which are used on the CP16 mother board. U2 (FIG. 8C) is also a programmable logic integrated circuit and, likewise, it conditions certain other outputs from the microprocessor to create certain other signals which are used on the CP16 mother board. U4 (FIG. 8D) is also a programmable logic integrated circuit, and it generates the reset and halt signals for the microprocessor. U4 illuminates the indicating LED (CR1), and it provides the reset signal for the CPC mother board. U4 also conditions the signal from crystal oscillator Y1, and it distributes the signal to the mother board and to the microprocessor. U5 is an integrated circuit which monitors the 5 V power supply on the module, and it also monitors the push button switch S1. When the power supply voltage falls below 5 V or when S1 is pressed, integrated circuit U5 generates a reset signal which it supplies to U4, so that U4 may reset the system.

U8 and U9 (FIG. 8A) are bi-directional data buffer integrated circuits, and they serve to multiplex the microprocessor data bits 8 through 15 and the microprocessor address bits 16 through 23, onto the CP16 mother board in a time-shared manner. U10 is also a bi-directional data buffer, and it serves to isolate the microprocessor data bits 0 through 7 from the CP16 data bits 0 through 7, and to connect the two of them when data needs to be transferred from the mother board to the microprocessor or from the microprocessor to the mother board. U6 and U7 are likewise bi-directional data buffers, and they serve to isolate the microprocessor address bits 1 through 15 from the CP16 address bits 0 through 15, and they serve to connect the two of them when the memory address from the microprocessor must be transferred to the CPC16. Resister networks RN1A-RN1D (FIGS. 8C, 8D) provide pull-up resistors for certain of the CP16 control signals which require pull-up resistors.

Figure 3A:
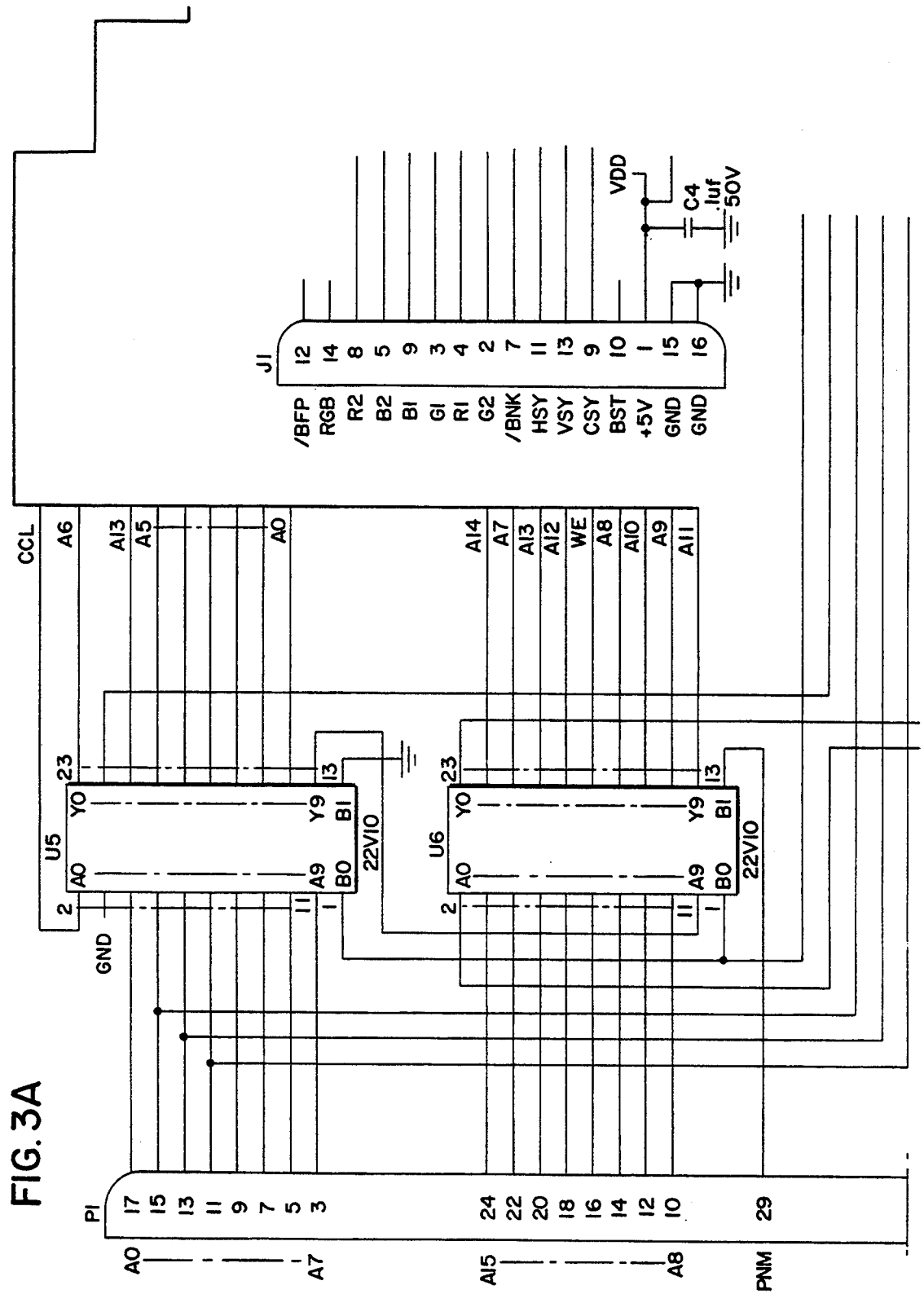
Figure 3B:
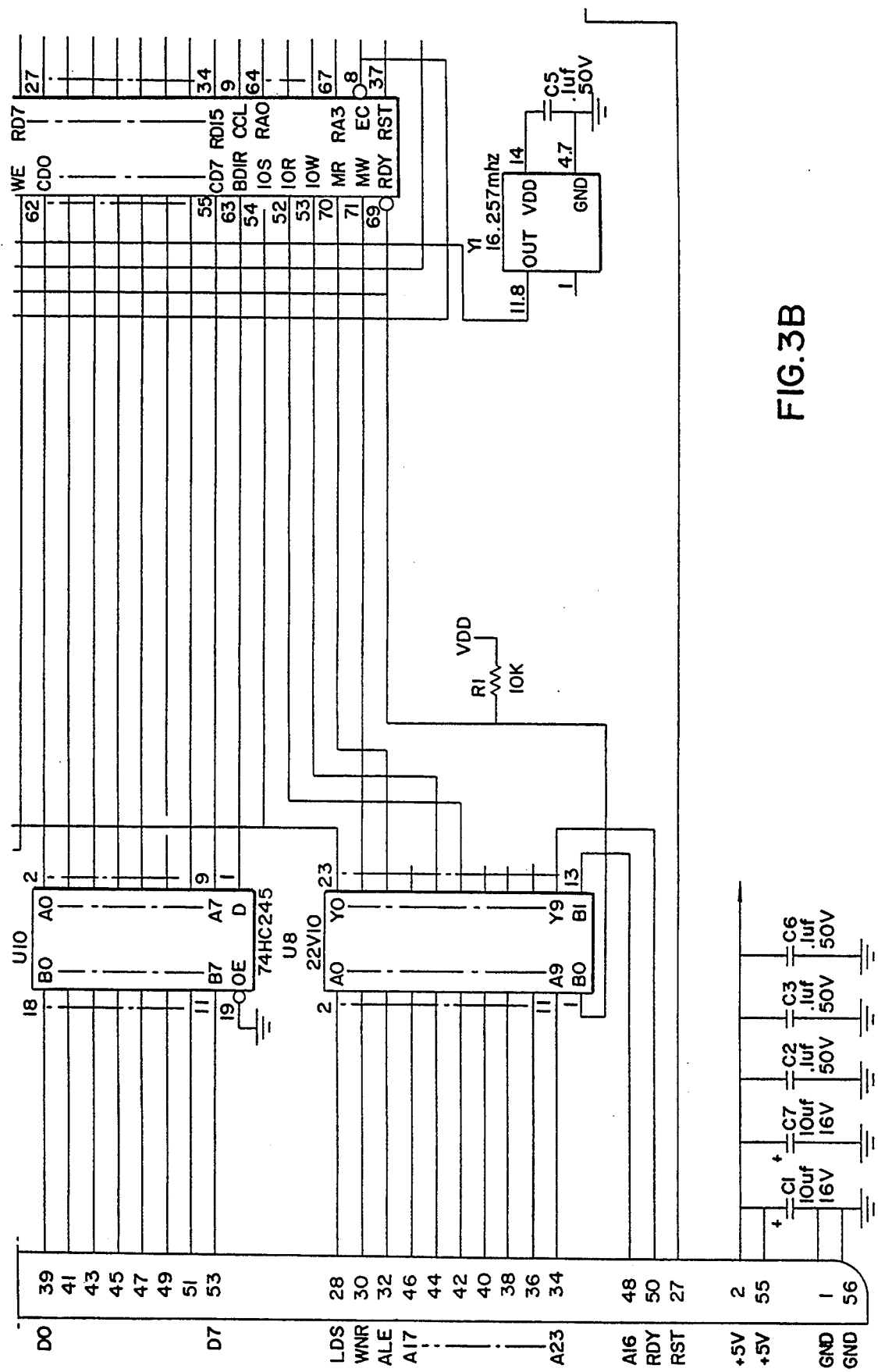
Figure 3C:
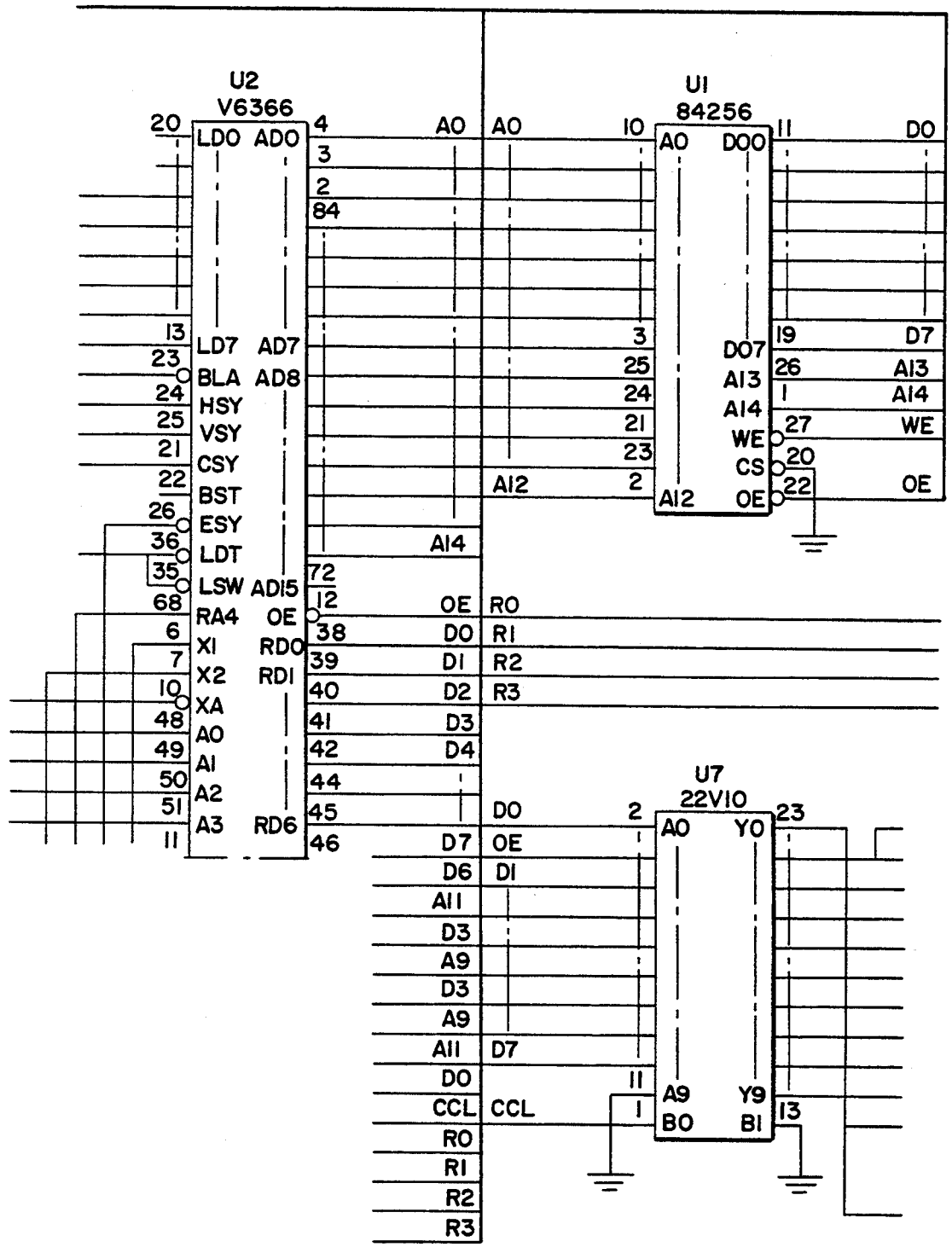
Figure 3D:
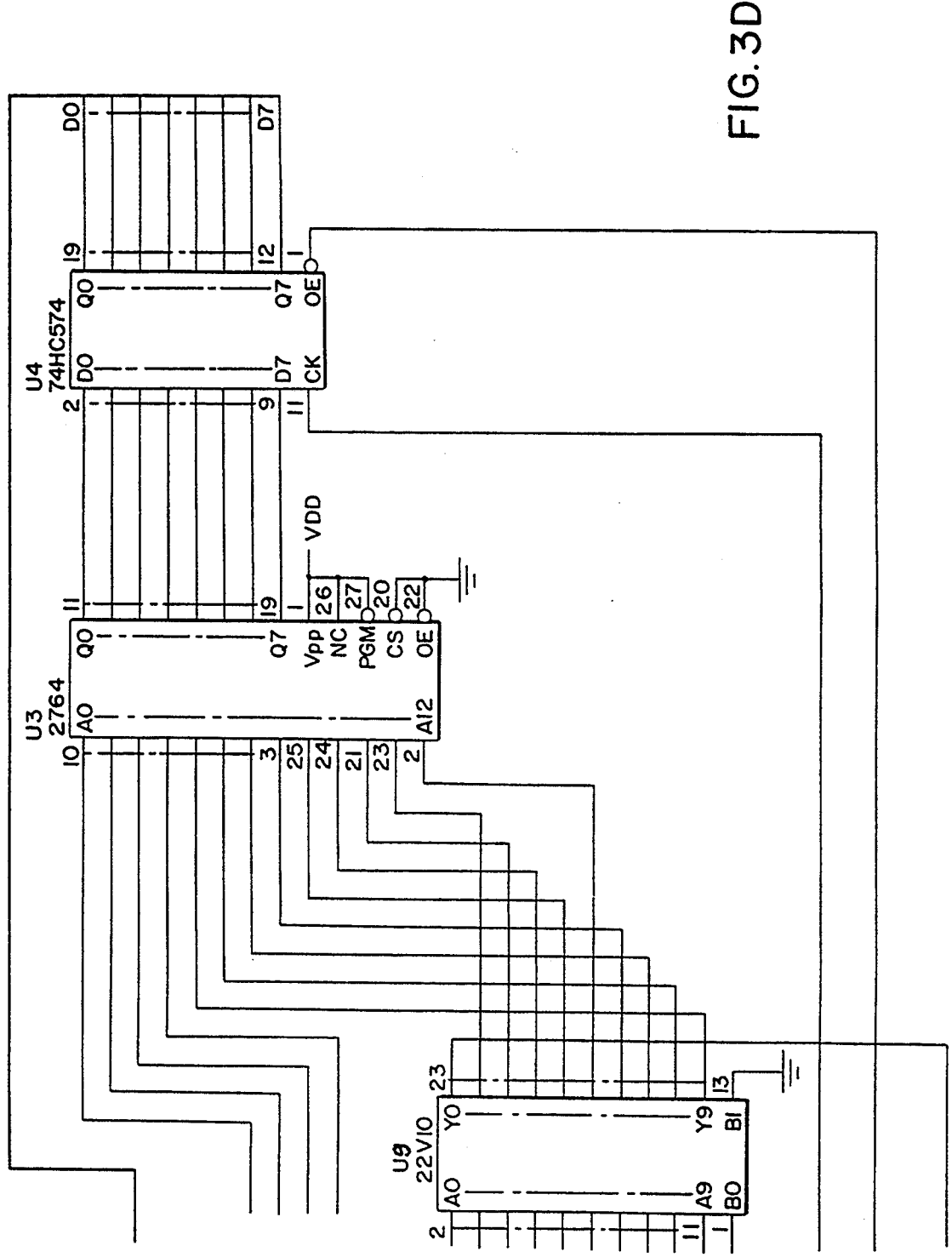
Figure 4A:
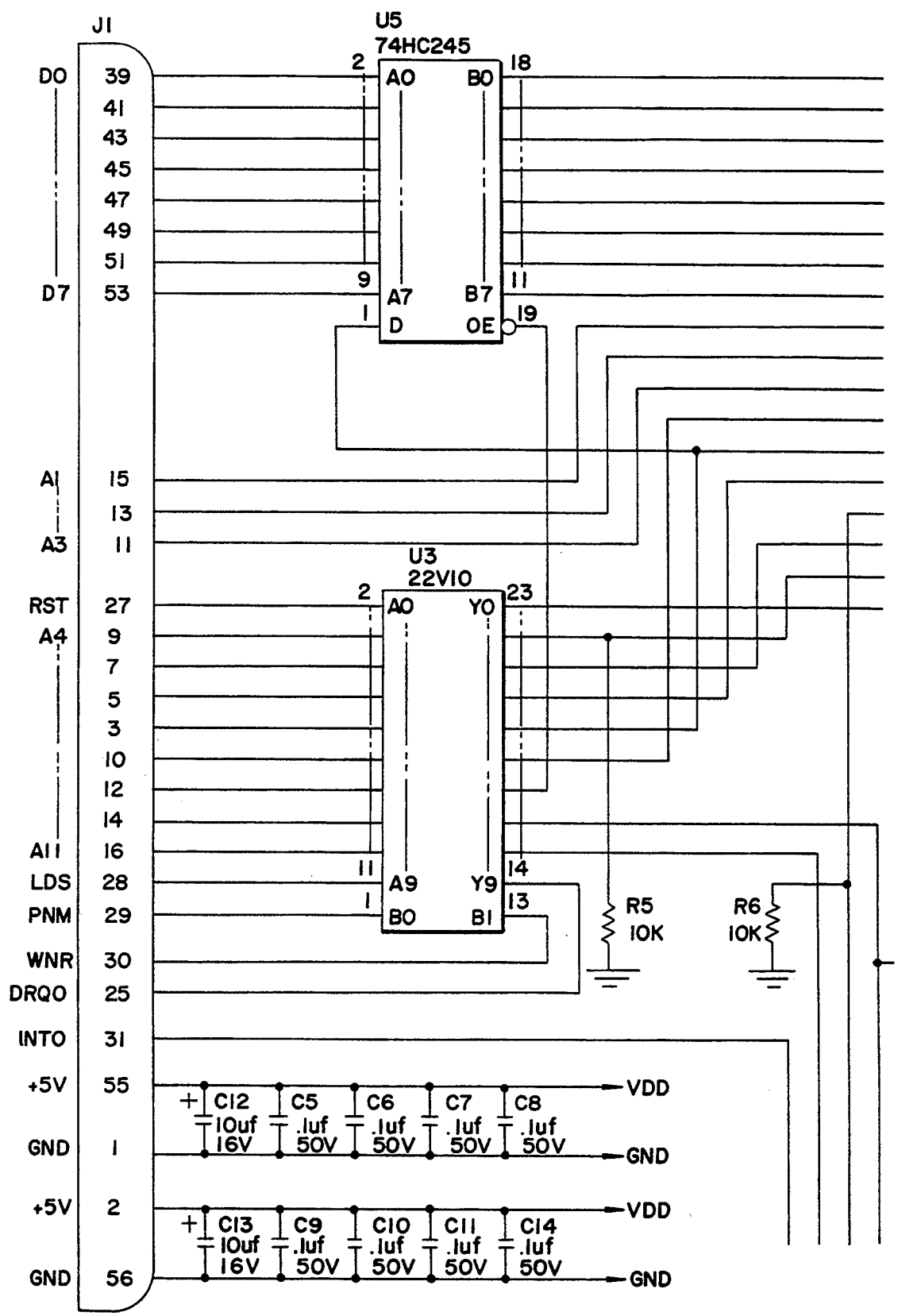
Figure 4B:
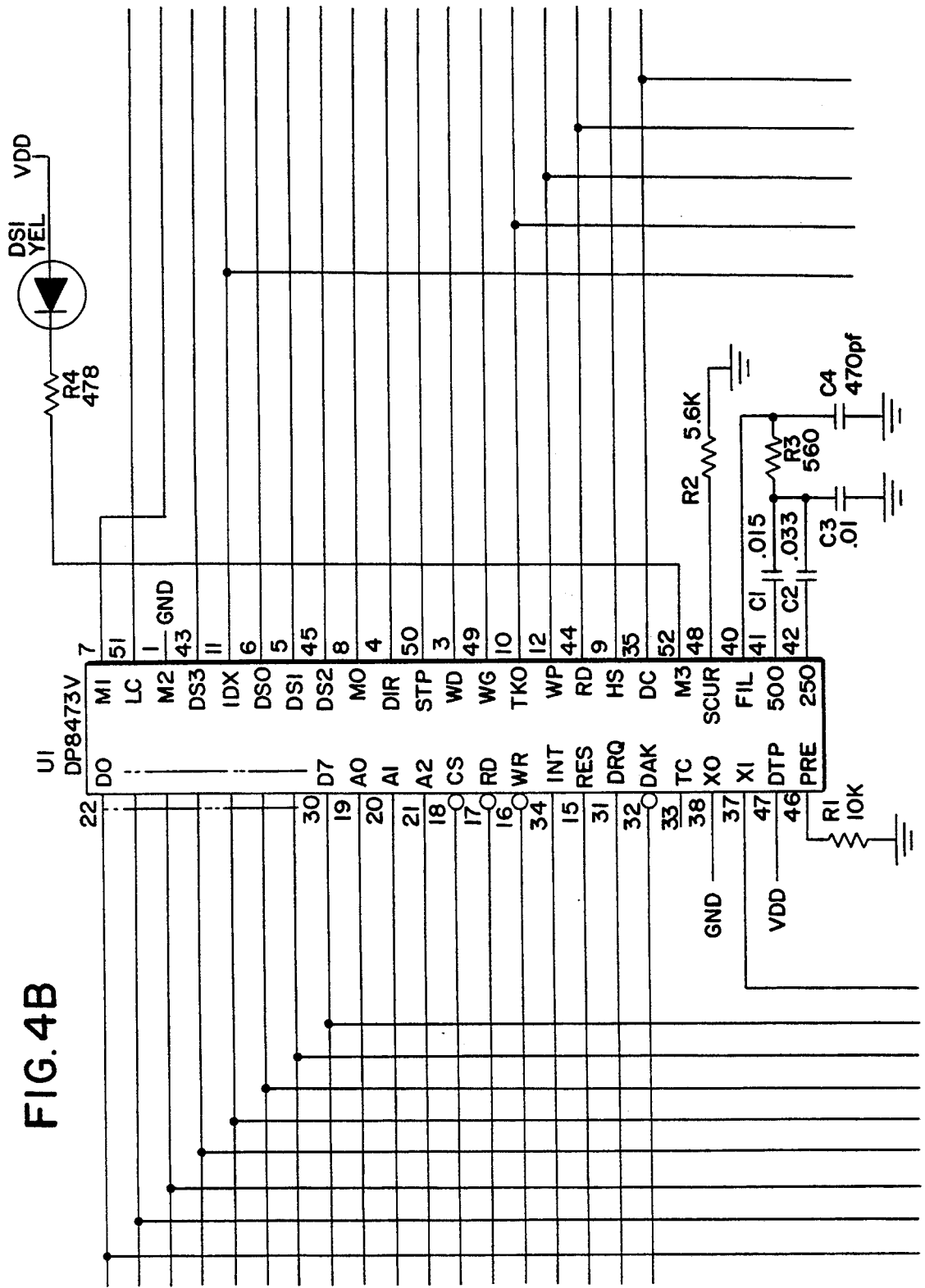
Figure 4C:
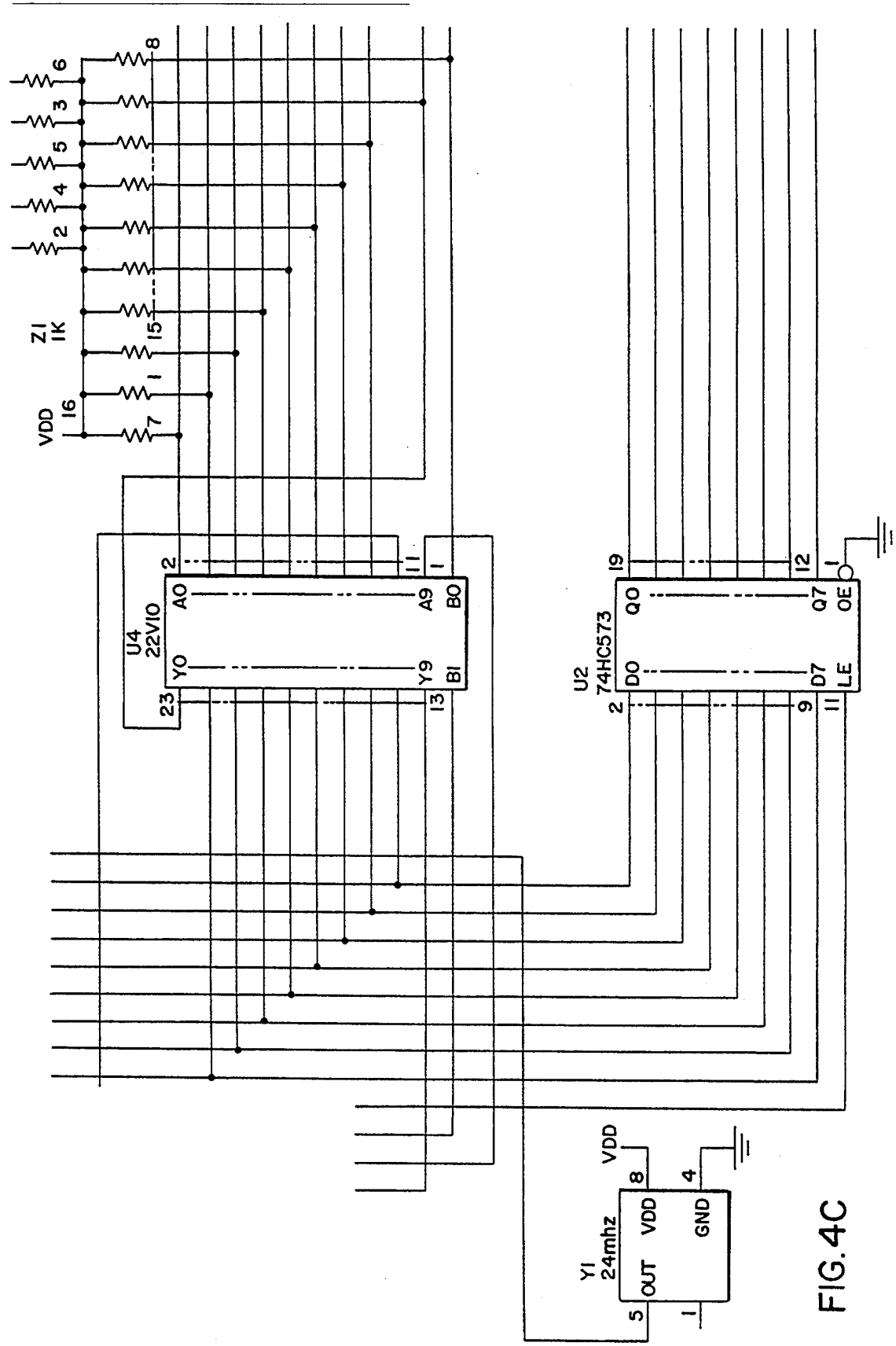
Figure 4D:
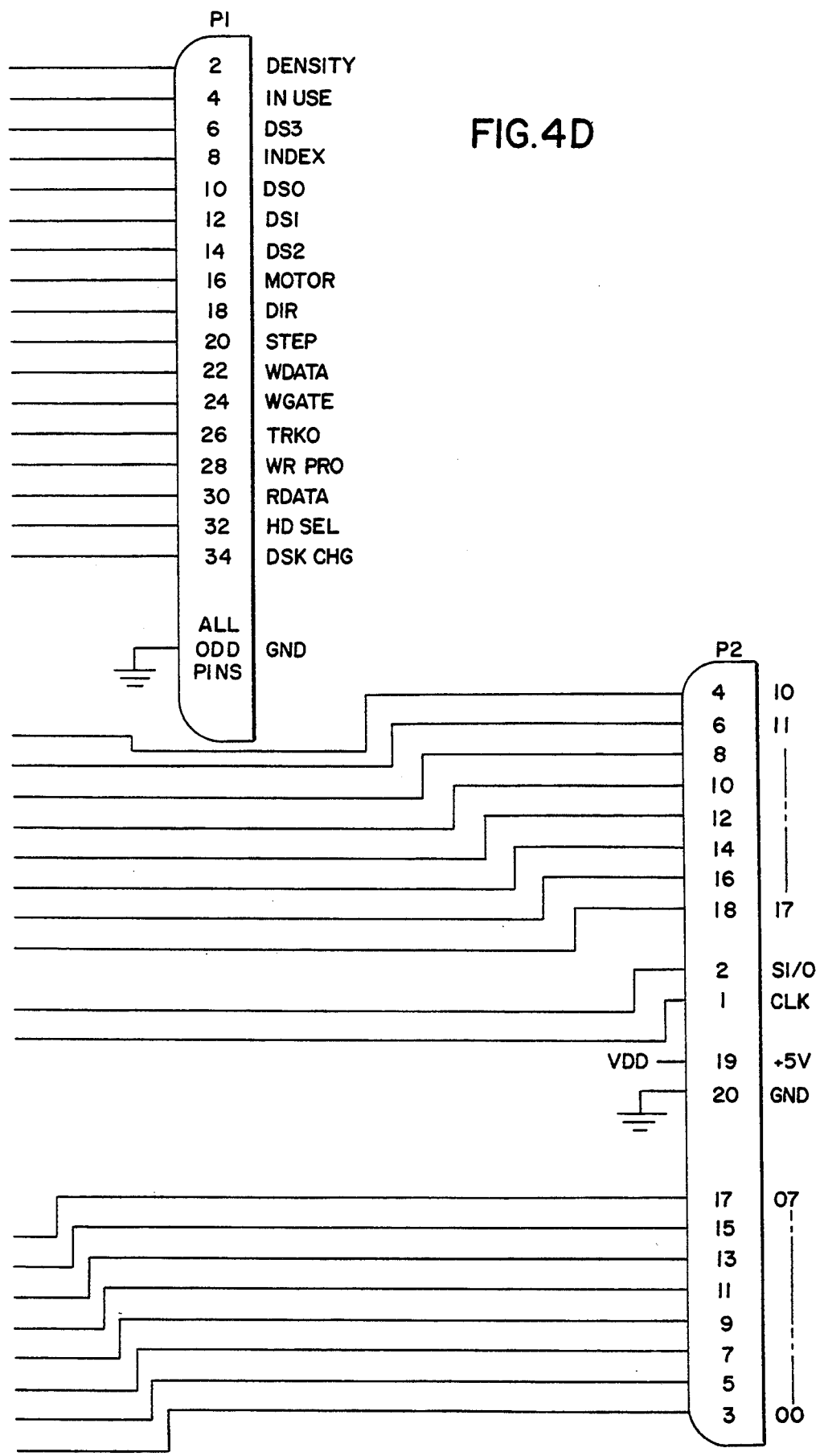

Included in the video module 22 of FIG. 2, U2 (FIG. 3C) is a VLSI integrated circuit which controls the video monitor connected to the module. All of the functions for the video monitor, such as horizontal sync, vertical sync, blanking, intensity and other signals are provided to the monitor by U2. U1 (FIG. 3C is a 32 kilobyte RAM chip, which serves as memory for the video monitor. U7 (FIG. 3C) and U9 (FIG. 3D) are programmable logic integrated circuits. U7 and U9 are configured as registers which temporarily store the character information from the CP16 and put it into the correct timing relationship to be presented to U3 (FIG. 3D).

U3 is an 8 kilobyte programmable read-only memory integrated circuit which is programmed to hold an IBM-compatible character set. The data needed to form the character is sent from U3 to U4 (FIG. 3D). U4 is a register which serves to hold the character and present it in the proper timing relationship to U2. U2 will then send the character to the video monitor. U5 and U6 (FIG. 3A) are programmable logic integrated circuits which condition the address bits on the CP16 mother board into a different format to be presented to the memory address U1 on the video module. U2 (FIG. 3B) is a bi-directional data buffer which serves to isolate the data bus on the video module from the data bus on the CP16, and to connect the two of them together when data needs to be transferred between them. U8 (FIG. 3B) is a programmable logic integrated circuit which decodes address bits on the CP16 mother board and presents a chip-select and other control signals to U2. Y1 is a crystal oscillator which provides the timing signals to U2.

The purpose of the SCSI bus monitor module 24 of FIG. 2 is to monitor the SCSI data bus, and to record events which occur on the SCSI data bus, so that they may be presented to the microprocessor 20 at a later time, together with timing information. U3 (FIG. 5A) and U4 (FIG. 5C) are each one kilobyte FIFO memories. U3 records events which take place on the data portion of the SCSI bus, and U4 records events which take place on the control part of the SCSI bus. U1 (FIG. 5A) is a programmable logic integrated circuit which conditions the data on the data portion of the SCSI bus to be presented to U3 for recording. U2 (FIG. 5C) is a programmable logic integrated circuit which conditions events on the control portion of the SCSI bus to present them to U4 for recording. U6 (FIG. 5C), U8 (FIG. 5B), U5 (FIG. 5C) and U7 (FIG. 5A) form a 32-bit counter which counts the number of microseconds between events on the SCSI bus and records that information in U3 and U4.

U9 (FIG. 5B) is a programmable logic integrated circuit which is programmed to provide the control signals needed by the memory integrated circuits and the counters. Y1 (FIG. 5B) is a crystal oscillator which provides timing for the timer and other circuits. U10 (FIG. 5B) is a programmable logic integrated circuit which is programmed to decode the address bits on the SCSI bus to select the bus monitor module when the microprocessor needs to read the data stored in it. U11 and U12 (FIG. 5A) are bi-directional buffer integrated circuits which serve to isolate the 16-bit data bus on the bus monitor module from the 16-bit data bus on the CP16 mother board, and to connect the two of them when data is to be transferred between them.

Monitor 24 is a built-in passive bus monitor which monitors the SCSI bus and captures all bus phases during an SCSI command execution. The monitor has a 32-bit counter timer which is clocked by a one microsecond clock. For each bus phase the monitor captures the SCSI bus data, the SCSI bus status and the time lapse for each bus phase. The bus monitor may be used as a simple debugging tool to find out why the execution of a command did not complete or which particular phase of the SCSI bus got hung up and the qualifier timed out. The SCSI bus activity report may be periodically examined to check the SCSI bus. The qualifier has a built-in editor to create programs using a combination of 6 and 10 CDB commands, along with a number of other commands that allow the operator to create a range from a simple program to more complex programs.

The floppy disc driver and keyboard module 26 of FIG. 2 provides control signals for the floppy disc drive 16, and to interpret the signals from keyboard 12. U2 (FIG. 4C) is a latching integrated circuit which provides control signals to the keyboard and to the front panel of the SCSI quaiifier. U4 (FIG. 4C) is a programmable logic integrated circuit programmed to form a shift register to shift the serial data from the keyboard and then to present the data in parallel to the CP16 mother board. U5 (FIG. 4A) is a bi-directional buffer chip which serves to isolate the data bus on the floppy driver and keyboard module 26 from the data bus on the CP16 mother board, and to connect the two of them when data is to be transferred between them. U3 (FIG. 4A) is a programmable logic integrated circuit which is programmed to decode the address bits on the CP16 mother board, and to provide chip-select signals for U1 and U4. Y1 (FIG. 4C) is a crystal oscillator which provides timing information for U1.

The SCSI module 28 of FIG. 2 provides a means for the microprocessor 20 to control the signals on the SCSI bus. U1 (FIGS. 9C, 9E) is an LSI integrated circuit which receives input from the CP16 microprocessor and controls all of the signals on the SCSI bus, according to protocols which are defined for such signals. A crystal oscillator Y1 (FIG. 9E) provides time information for U1. An additional DMA memory module 30 attaches to the back of the SCSI bus module 28, and will be described in conjunction with FIGS. 11A-11C. U5 (FIG. 9D) is a programmable logic integrated circuit which provides control signals for the piggy back DMA memory module. U2 and U3 (FIG. 9A) are programmable logic integrated circuits which condition the 16-byte address bus on the CP16 mother board to a form which is suitable to apply to the piggyback memory board. U6 (FIG. 9A) is a B1-directional bus buffer which serves to isolate the 8-byte data bus on the SCSI bus module 28 from the data bus on the CP16 mother board, and to connect the two of them when data should be transferred between them. U4 (FIG. 9D) is a programmable logic integrated circuit, which is programmed to decode the address bus on the CP16 mother board, and to provide chip select signals for the piggy back memory board as well as for U1.

U1, U2, U3 and U4 (FIGS. 11A-11C) of the DMA memory module 30 of FIG. 2 are each 32 kilobyte random access memory chips. U7 (FIG. 11C) is a programmable logic integrated circuit which provides control signals for the memory chips. U5 (FIG. 11B) is a bi-directional data bus buffer which isolates the data bus used by U1 and U2 from the data bus used by U3 and U4, so that the outputs of the two sets of memory chips can be compared. U6 (FIG. 11C) is an 8-byte comparator which compares the output of U3 and U4 with the output of U1 and U2. If the contents do not match, an error signal is sent from U6 to the microprocessor.

The EPROM module 18 of FIG. 2 serves to store the program memory for the microprocessor 20. U1 (FIG. 10A) and U2, U3, U4 (FIG. 10B) are each 32 kilobyte erasable, programmable, read-only memory integrated circuits. U5 and U6 (FIG. 10A) are bi-directional bus buffer integrated circuits which serve to isolate the 16-byte address bus on the EPROM module from the 16-byte address bus on the CP16 mother board, and to connect the two of them when address information needs to be transferred to the EPROM module. U9 (FIG. 10A) is a bi-directional bus buffer circuit which serves to isolate data bytes 0 through 7 on the EPROM module from data bytes 0 through 7 on the CP16 mother board, and to connect the two of them when data is to be transferred between them. U8 (FIG. 10C) is a bi-directional bus buffer integrated circuit which serves to isolate data bytes 8 through 15 on the EPROM module 18 from the multiplexed data bytes 8 through 15 on the CP16 mother board, and to connect the two of them when data is to be transferred between them. U7 (FIG. 10C) is a programmable logic integrated circuit which decodes the CP16 address bus to provide chip selects and other control signals for the memory chips.

The communication module 32 of FIG. 2 provides two RS232 serial ports and one IBM-compatible CENTRONICS printer port for the CP16 computer. U3 (FIG. 6A) is an LSI integrated circuit which provides all of the control signals for two standard RS232 serial ports. U1 and U2 (FIG. 6D) are integrated circuit RS232 driver chips, each of which has a built-in power supply to generate $+10$ V and $-10$ V from the $+5$ V power supply unit, and provides three transmitters and three receivers to transfer the $+5$ V logic signals into the logic signals into $+$ or $-10$ V logic signals to go from the communications module to the RS232 bus, and to receive $+$ and $-10$ V signals, and translate them into $+5$ V signals for signals that are coming from the RS232 bus into the communication module. U4 (FIG. 6C) is a latching integrated circuit which provides data bytes to the parallel printer port. U5 (FIG. 6C) is a latching integrated circuit which latches control signals which are returned from the printer so that they can be interpreted by the microprocessor. U7 (FIG. 6B) is a programmable logic integrated circuit which is programmed to generate the control signals needed by U4 and U5. Y1 (FIG. 6B) is a crystal oscillator which provides timing signals for the RS232 chip U3. U8 (FIG. 6A) is a bi-directional bus buffer integrated circuit which isolates the data bus on the communications module from the data bus on the CP16 mother board, and connects the two of them when data must be transferred between them. U6 (FIG. 6A) is a programmable logic integrated circuit which decodes the address bus on the CP16 mother board, and provides chip select and other control signals for U3 and U7.

Figure 10:
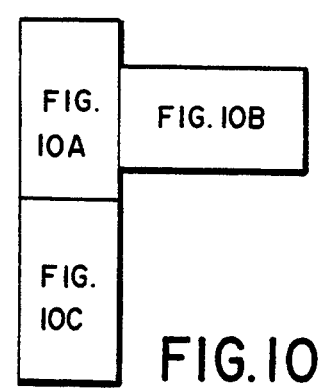
FIGS. 10A-10C collectively represent a schematic circuit diagram of an EPROM module and of an SRAM module shown in block form in FIG. 2, and these FIGURES are collectively grouped as shown in FIG. 10.
Figure 10A:
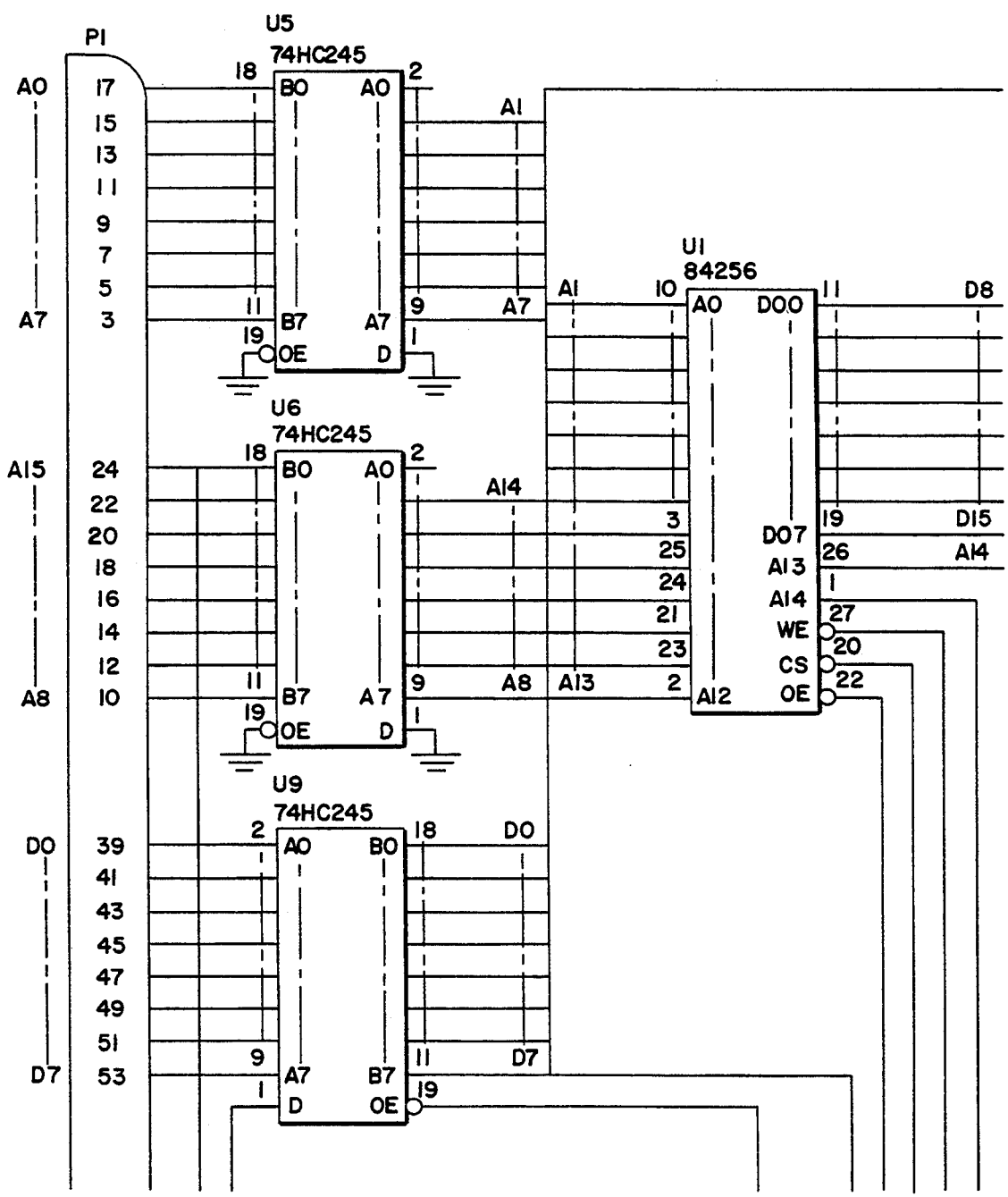
Figure 10C:
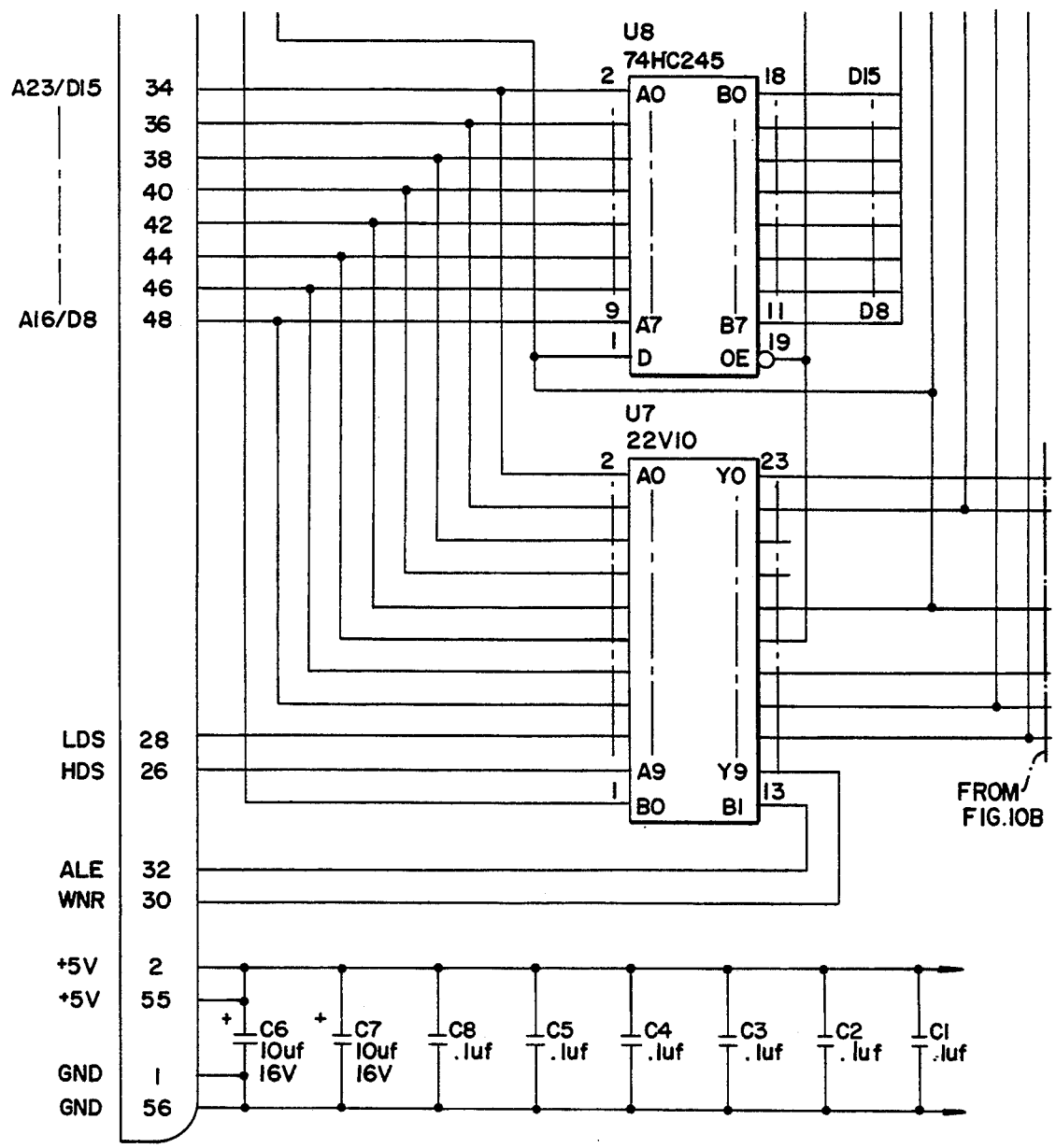
Figure 11:
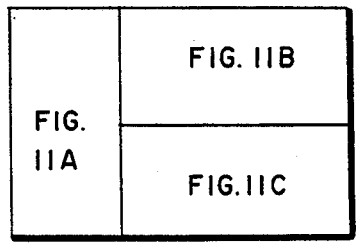
FIGS. 11A-11C collectively represent a schematic circuit diagram of a DMA module shown in block form in FIG. 2, and these FIGURES are collectively grouped as shown in FIG. 11.
Figure 11A:
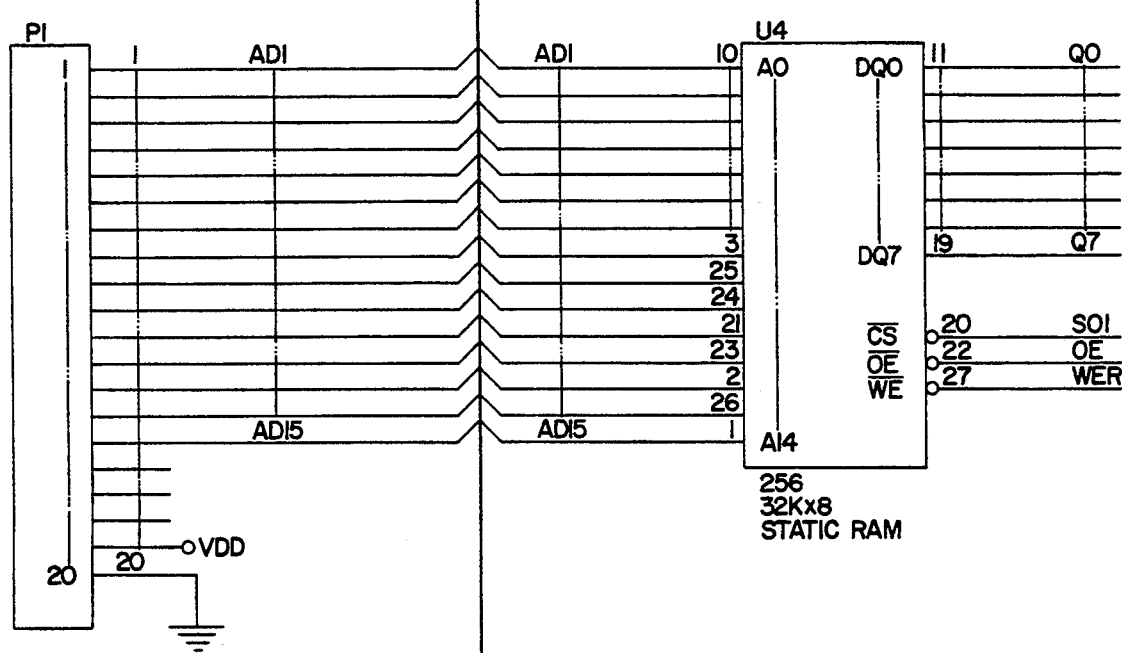
Figure 11A:
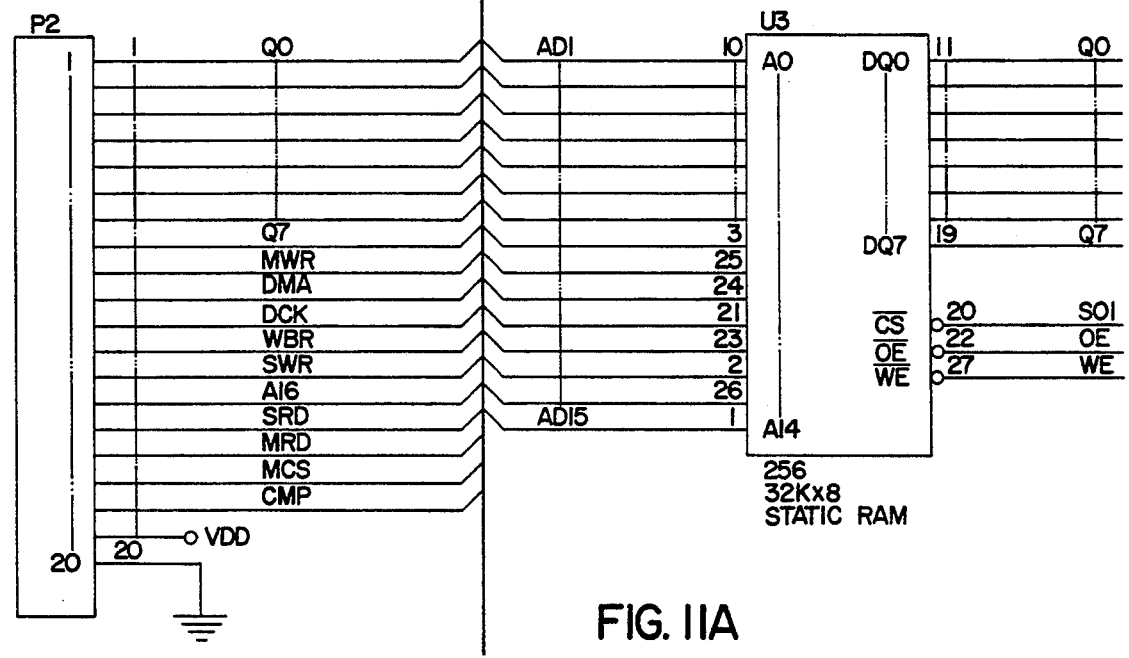
Figure 11B:
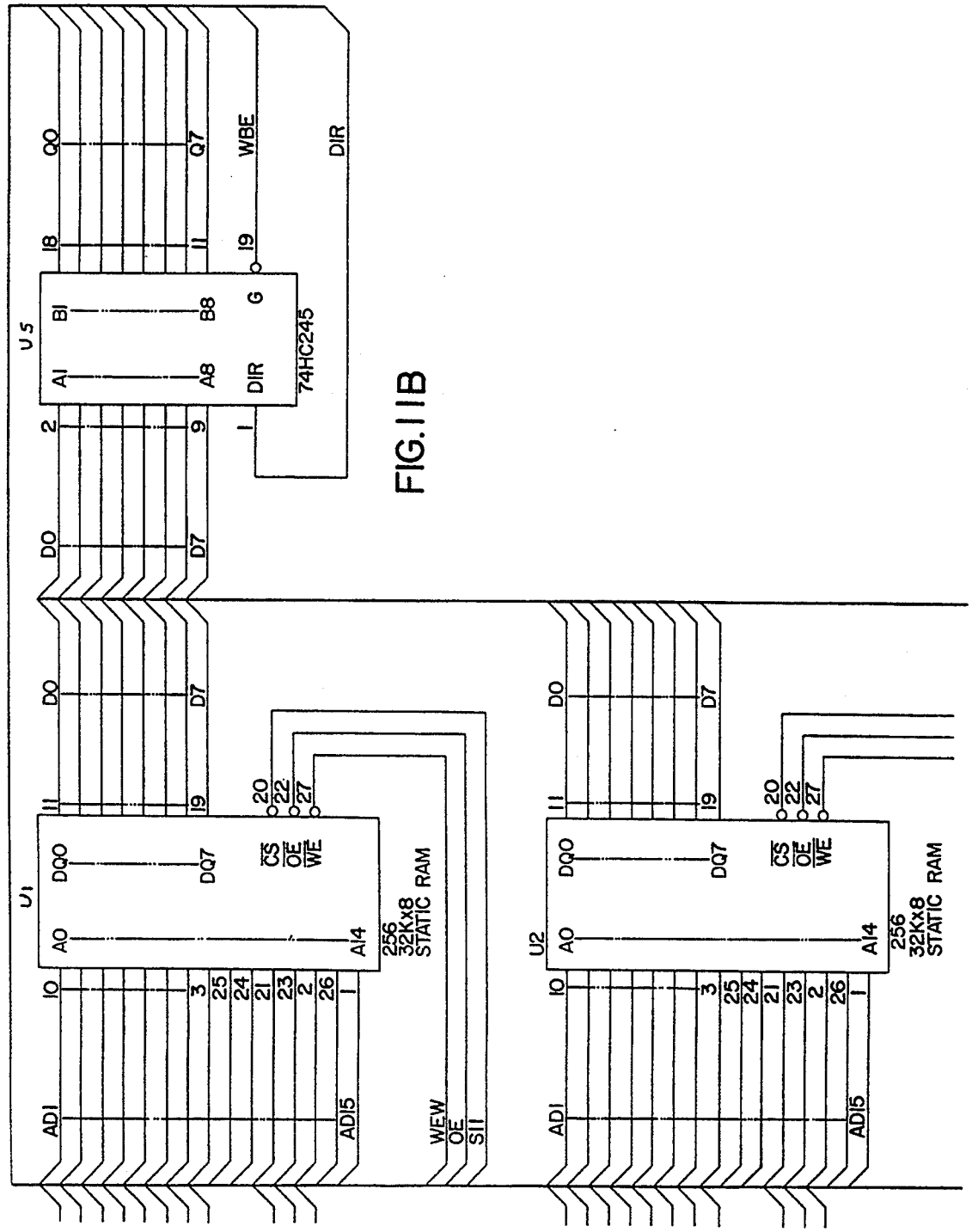

The Static Random Access Memory (SRAM) module 36 of FIG. 2 provides a static random-access memory for the micro processor. This module has the same circuitry as EPROM module 18 (FIGS. 10A-10C). In the static random-access memory U1, U2, U3 and U4 of FIGS. 10A-10C are each 32 kilobyte random-access memory chips. U5 and U6 of FIG. 10A are bi-directional bus buffers which serve to isolate the address by on the SRAM module 36 from the address bus on the CP16 mother board, and which also serves to connect the two of them when address information needs to be transferred to the SRAM module. U9 of FIG. 10A is also a bi-directional bus buffer integrated circuit which serves to isolate data bytes 0 through 7 on the SRAM module 36 from data bytes 0 through 7 on the CP16 mother board, and to connect the two of them when data needs to be transferred between them. U8 of FIG. 10C is a bi-directional bus buffer circuit which serves to isolate data bytes 8 through 15 on the SRAM module 36 from the multiplexed address and data bytes on the CP16 mother board, and which also serves to connect the two of them when data needs to be transferred between them. U7 of FIG. 10C is a programmable logic integrated circuit which decodes the address bus on the CP16 mother board, and generates chip-select signals and other control signals from the Static Random Access-Memory Integrated Circuits U1, U2, U3, and U4.

In EPROM module 18, U1–U4 are of the type designated 27 C256; and in the SRAM module 36, U1–U4 are of the type designated 84256.

As mentioned above, the qualifier of the invention uses a multiplicity of screens which are selectively displayed by a cathode ray tube under the control of a keyboard, and which directly display the ANSI defined names, labels and error messages for immediate comprehension by the operator.

The CRT 14 initially presents information in three general areas of each screen, as shown, for example, on the Main Menu screen of FIG. 12. These three areas comprise a Title and Action area, a Menu Selection area, and a Current Tester Status area.

The top portion of the displayed screen presents the title of the menu display, a request for the desired action and a real time clock display with AM and PM indications. The time is presented by the real clock in the upper right hand corner of the displayed screen.

The middle area constitutes the major portion of the screen, and it is located directly below the Title and Action area.

The bottom area of the screen presents the current status of the qualifier, and this area contains many pieces of information which are updated throughout the operation of the qualifier. The information presented in the bottom area generally indicates the last action requested and the resulting status.

The status information appears on the displayed screen at various times when it is appropriate to use nearly the entire screen. However, while the status box is then invisible on the displayed screen, it is still updated as the operation of the qualifier progresses. At appropriate times, typically after completion of the tester operations, the current visible display in the bottom portion of the displayed screen will be replaced with the current status. This is achieved by changing the current tester status from being invisible to visible. The reason for the method described above is to use more efficiently the available display and avoid placing too much information into a small area thus making it difficult to read.

When any key on the key board 14 of the qualifier is depressed the qualifier is caused to display its main menu screen on the CRT 14. The Main Menu screen takes the form shown in FIG. 12. The Main Menu appears in the middle area and present either a choice of sub-level menus, or actual choices to execute. In subsequent sub-level menu screens displayed by CRT 14, this area can be either a choice of additional sub-level menus or actual choices to execute.

The SCSI bus allows up to seven Targets to be connected to the bus. Each Target is identified by a Target Identification Number (TID). No two Targets can have the same TID. Only one Target TID can communicate with the qualifier at a time. The qualifier identification number (NIT ID) has top priority on the bus which means that whenever the bus is free to use, the qualifier will have priority over the Target TID's. Selecting menu item "Select Target ID" from the Main Menu initiates an automatic process of polling the SCSI bus for available TID's on the bus. The qualifier uses the Inquiry command to poll and report the available targets and allows selection of any one TID. Once the TID is selected, the qualifier is set up internally to communicate with that TID only. If there are more than TID's on the bus, then the "Select Target ID" procedure must be followed to switch from TID to another.

In order to transmit any command to a particular target, the SCSI bus ID must be known. The qualifier is set to SCSI bus ID seven (7) at power up. To execute commands available from (1) 6CDB SCSI commands menu; (2) 10CDB SCSI commands menu; (3) vendor unique commands; (4) canned diagnostics, etc., it is necessary to select the SCSI device which will become the target of the qualifier. This function is initiated by selecting (0) from the Main Menu screen of FIG. 12. This selection causes the qualifier to scan through all seven of the available SCSI bus ID's. The first screen display after starting the "CHECKING FOR TARGETS" function will display a list of seven possible SCSI ID's. The next step of the target selection is to select the target ID on which subsequent step tests are to be conducted. The displayed screen lists the available SCSI ID's, but any ID 0–6 may be specified as the qualifier's SCSI bus target ID. After the selection has been made, the qualifier returns to the Main Menu screen of FIG. 12 for further choices. The status box information now reflects the SCSI device which is the target ID.

The 6CDB SCSI Commands, as represented by the screen of FIG. 13, make up many of the commonly used functions in SCSI. The screen of FIG. 13 shows the range of commands available from the 6CDB menu. Several of the menu choices displayed on the screen of FIG. 13 require additional information from the user. The screen layout and text descriptions are displayed in a manner to improve understanding of the information, or the requirements for proceeding to the next step. The commands which require user input or editing are: (4) "Mode Sense", (5) "Mode Select", (F) "Format Unit", and (E) "Enter Command Manually".

"Mode Select" is the complement command to "Mode Sense". "Mode Select" is used to send operational parameters to the target. The "Format Unit" command initiates a low level format operation. The "Enter Command Manually" function is one of the more powerful functions available in the 6CDB Menu of Functions. This function choice allows the user to select any 6CDB commands including the data out phase.

The 10CDB SCSI commands represented by the screen of FIG. 14 round out the list of commonly used functions in SCSI. The screen of FIG. 14 shows the range of commands available from the 10CDB menu. Most of the commands included in this menu of choices are with options or choices that need input. Several of the menu choices displayed on the screen require additional information from the user. The screen layout and the text descriptions are displayed in a manner to improve the user's understanding of the information and what is required to proceed to the next step.

The commands which require user inputs or editing are listed on the screen of FIG. 14 as the commands identified as 0, 1, 2, 3, 4, 5, 6, 7, 8 and D, E. The "Read Defect List" (D) command is used to retrieve a list of media defects maintained by the target. The "Write and Verify" command (3) requests that the target write the data transferred from the qualifier to the medium and then verify that the data is correctly written. The "Verify" command (4) requests the target verify the data written on the medium. The "Write Buffer" (5) is used in conjunction with the "Read Buffer" (6) as a diagnostic for testing the target memory and the SCSI bus integrity. The "Enter Command Manually" function (E) allows the user to use virtually ten byte command.

The qualifier also incorporates a menu system function which allows the user to enter and save any SCSI commands. This is useful in adding "Vendor Unique" commands which are not standard SCSI defined commands, or a standard command configured in a manner commonly used by the user. The commands built into this menu function are stored in the non-volatile RAM (NVR) of module 34 of FIG. 2. The initial screen will display ten lines of programs entitled "Unused" until the first "Vendor Unique" command is built. The "Canned Diagnostic" function (4) of the Main Menu screen of FIG. 12 checks if the quaiifier has the required parameters from the selected target to be able to execute properly.

The sub-menu level screen of FIG. 15 is designated "Tester Functions" and it serves to set many of the operational characteristics of the qualifier. The first function designated (0) "Initialize NV RAM" in included to provide a rapid means for initializing the non-volatile RAM (NVR) of module 34 of FIG. 2. This function erases all stored data and resets the titles to "Unused" for "Vendor Unique" commands and "User Created" programs.

The function designated (1) on the screen of FIG. 15 is "Display REV Level". This function is included to provide a quick means for displaying the initial sign-on message screen of the qualifier. The function designated (2) "Set, Date and Time" is used to set the internal clock and calendar. During the periods when the qualifier is disconnected from the AC power source, the clock and calendar continue to be energized from an internal self-contained battery.

The function designated (3) "Set SCSI Command Time Out" is used to set the maximum time limit that the qualifier should wait for the SCSI command to be completed. The function designated (5) "Set Baud Rate" allows adjustments in the serial data transfer Baud Rate to match that of another device. The function designated (4) "Toggle Print Screen" is used to provide a means to enable or disable the printer port.

The invention provides, therefore, a qualifier constructed to be used in conjunction with small computer system interfaces (SCSI), and which is constructed to make the abstract nature of SCSI definitions easier to understand and work with. The qualifier of the invention is constructed to use a simple and built-in concept which permits the operator quickly to become familiar with SCSI protocol and command structure, and which enables the operator to use the qualifier with built-in canned diagnostics to execute complex performance tests on the targets with just a few keystrokes.

Specifically, the present invention provides a qualifier for testing SCSI interfaced disc drives which, in the embodiment described, is a portable stand-alone tester for testing and evaluating SCSI direct access and sequential access devices (hard disc drives and tape drives) in accordance with ANSI SCSI-1 and ANSI SCSI-2 definitions. As described above, the qualifier is completely menu driven. All commands are executed with a single keystroke. It also describes, the qualifier includes a CRT display which is divided into two sections, namely a Work Space in which all menus, data and error messages are displayed, and a "Status Window" which displays the current status of the SCSI bus and the qualifier. A built-in, easy-to-use editor allows convenient access to command descriptor blocks, mode select parameters, defect list headers, and diagnostic subcommand headers.

The qualifer of the invention is constructed so that all ANSI defined SCSI commands may be executed, or modified and executed, by a simple yes/no operator interaction. Command descriptor blocks are displayed directly in plain language in accordance with ANSI definitions, rather than as codes which require the operator to refer to external tables to obtain the ANSI definitions. Check condition and additional sense codes are also decoded and the corresponding ANSI definitions are displayed in plain language.

The menu of the qualifer of the invention permits many special functions to be selected, including:
Turn Disconnect on/off.
B. Logical Unit Number.
C. Programmable Command Time Out.
D. Programmable Selection Time Out.
E. Programmable Synchronous Negotiation.
F. Graphical Display of SCSI Bus Events.
G. Display of Logical Block Errors.

It will be appreciated that while a particular embodiment of the invention has been shown and described, modifications may be made, and it is intended in the following claims to cover all modifications which come within the true spirit and scope of the invention.

DEFINITIONS

INITIATOR—The qualifier which initiates all activity on the SCSI bus.

NIT ID—The qualifier identification number which is preset to ID 7.

TARGET—The SCSI device (EG Disc Drive, Tape Drive, etc.) that responds to all activity initiated by the qualifier.

TID—The SCSI target identification number, which can be 0, 1, 2, 3, 4, 5 or 6. No two devices (initiator or target) can have the same ID.

DRV—Indicates if the target is ready (RDY) or not ready (NRDY) to execute media access related SCSI commands.

CDB—SCSI Command Descriptor Block, can be 6 or 10 bytes long.

STATUS—Information byte returned by Target during status bus phase.

MESSAGE—Information byte returned by Target during Message in bus phase.

LBA—Logical Block Address.

BLKSIZE—Number of data bytes in one Logical Block Address.

READCAP—The maximum number of accessible Logic Block Addresses.

SKEY—The Sense key byte returned by the Target when the qualifier executes a Request Sense Command manually or automatically.

ASENSE—The Additional Sense Code returned by Target when the qualifier executes a Request Sense manually or automatically.

We claim:

1. A programmable qualifier for testing and evaluating SCSI magnetic disc drives, and the like, connected to the qualifier by an SCSI bus, said testing and evaluation being in accordance with American National Standards Institutes (ANSI) standardized small computer system interface (SCSI) protocols, said qualifier comprising: a microprocessor; a cathode ray tube, a keyboard, first circuitry connecting the microprocessor to the cathode ray tube; second circuitry connecting the keyboard to the microprocessor to cause the microprocessor to introduce signals to the cathode ray tube through said first circuitry; third circuitry connecting the microprocessor to the SCSI bus to cause binary information to flow back and forth on the bus between the qualifier and the disc drive selected by the qualifier, said binary information being interpreted by the microprocessor and caused thereby to be displayed by the cathode ray tube in a predetermined format which includes ANSI defined names, labels, error messages, and the like.

2. The qualifier defined in claim 1, and which includes an internal disc drive; and further circuitry connecting the microprocessor to the internal disc drive to enable the internal disc drive to record data received by the qualifier from the selected disc drive being tested.

3. The qualifier defined in claim 1, in which the qualifer is menu driven, in which the cathode ray tube is caused to display a multiplicity of menu screens under the keyboard, and in which the microprocessor causes the information displayed on each menu screen selected by the operator to be divided into a first area displaying menus, data, error messages, and the like, in accordance with ANSI standard protocols, and a second area displaying a current status of the SCSI bus of the qualifier.

4. The qualifier defined in claim 3, in which the microprocessor enables the qualifier to select different screens for display by the cathode ray tube each by a single keystroke of the keyboard.

5. The qualifier defined in claim 1, and which includes direct memory access circuitry connected to the third circuitry to provide direct memory access to transfer large blocks of data between the microprocessor and the SCSI bus.

6. The qualifier defined in claim 1, and which includes at least one port for connection to peripheral equipment; and communication circuitry connecting the microprocessor to the port for providing control and data signals to tke peripheral equipment.

7. The qualifier defined in claim 1, and which includes a bus monitoring circuit connected to the microprocessor and to the SCSI bus for monitoring the data on the bus and for recording events recurring on the bus for presentation to the microprocessor at a later time.

8. The qualifier defined in claim it and which includes EPROM circuitry for storing the program for the microprocessor.

9. The qualifier defined in claim 1, and which includes a static random access memory connected to the microprocessor.

* * * * *